United States Patent [19]

Tse et al.

[11] Patent Number: 5,294,678
[45] Date of Patent: Mar. 15, 1994

[54] ENTANGLEMENT-INHIBITED MACROMOLECULES

[75] Inventors: Mun-Fu Tse, Seabrook; Anthony J. Dias, Houston; Prasadarao Meka, Seabrook, all of Tex.; Kenneth O. McElrath, Waterloo, Belgium

[73] Assignee: Exxon Chemical Patents Inc., Linden, N.J.

[21] Appl. No.: 9,692

[22] Filed: Jan. 27, 1993

Related U.S. Application Data

[62] Division of Ser. No. 634,846, Dec. 27, 1990, Pat. No. 5,206,303.

[51] Int. Cl.$^5$ .................... C08F 255/08; C08F 257/02
[52] U.S. Cl. ................................... 525/319; 525/322; 525/324
[58] Field of Search ....................... 525/319, 322, 324

[56] References Cited

U.S. PATENT DOCUMENTS 3,989,768  11/1976  Milkovich et al. .................. 525/292
5,182,350   1/1993  Fuseo et al. .......................... 526/308

FOREIGN PATENT DOCUMENTS 0344021  11/1989  European Pat. Off. .

OTHER PUBLICATIONS

Ferry, J. "Viscoelastic Properties of Polymers", John Wiley, 1970, pp. 269, 270 & 406.

*Primary Examiner*—Vasu S. Jagannathan
*Attorney, Agent, or Firm*—C. L. Bell

[57] ABSTRACT

A grafted and/or functionalized macromolecule comprises entanglement-inhibited architecture wherein the polymer exhibits reduced melt viscosity. In one embodiment, the macromolecule comprises a polymer of an isoolefin having about 4 to about 7 carbon atom and a para-alkylstyrene, wherein a grafted macromonomer such as a terminally functionalized polystyryl chain of very narrow molecular weight distribution is attached to the para-alkyl group of the para-alkylstyrene such that entanglement of adjacent chains in the melt are inhibited. In addition to distributed macromonomer grafts, other functionality may be attached to the para-alkyl group of the para-alkylstyrene to introduce other desirable properties such as radiation curability. In another embodiment the macromolecule comprises a polymer of one or more simple olefinic monomers wherein a macromolecule is attached to pendent functionality and/or copolymerized into the polymer backbone. A particularly preferred macromonomer comprises a terminal norbornene functional group.

62 Claims, 2 Drawing Sheets

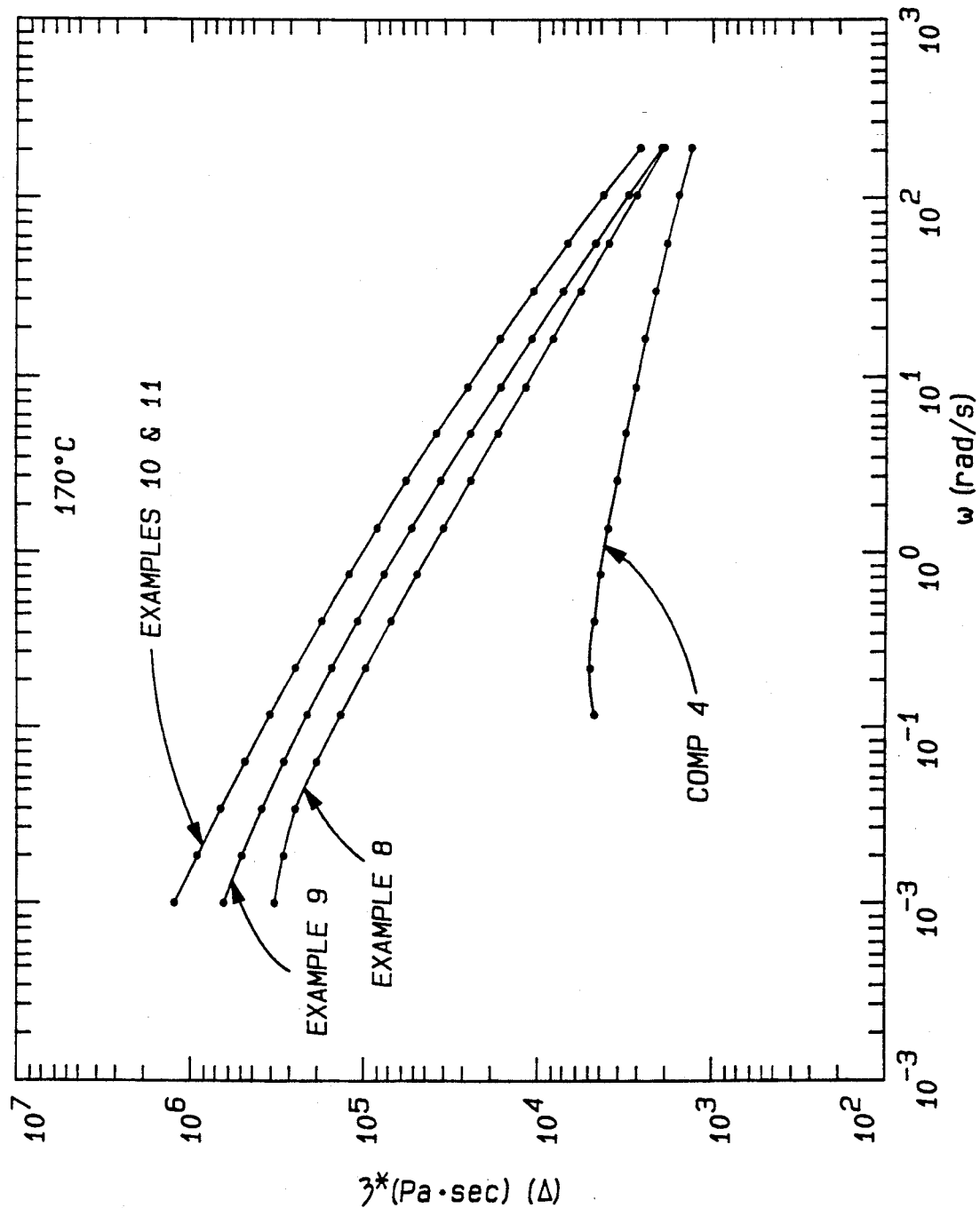

ENTANGLEMENT-INHIBITED MACROMOLECULES

This is a division, of application Ser. No. 634,846, filed Dec. 27, 1990, now U.S. Pat. No. 5,206,303.

FIELD OF THE INVENTION

This invention relates to macromolecules having an entanglement-inhibited architecture, and more particularly to macromolecules having a main chain and a plurality of side chains distributed along the main chain such that the side chains have a low enough molecular weight to inhibit side chain entanglement and are spaced along the backbone frequently enough to inhibit main chain entanglements.

BACKGROUND OF THE INVENTION

The role of macromolecules is pervasive in the manufacture and fabrication of a wide variety of articles. Plastics, synthetic fibers, elastomers and innumerable other products are derived from polymers. Common macromolecular architectures include linear, branched, and crosslinked or networked structures. A great deal of effort and attention has been funnelled into polymerization processes, i.e. the preparation of polymers. Much effort has also gone into the preparation of useful articles from polymers once they have been prepared. Such polymer processing techniques commonly involve molten processing of the polymers. Such molten processing technology includes molding, extrusion, compounding, spinning, and other procedures.

A persistent problem remains in the fabrication of useful articles from polymers because of the unique rheological and mechanical properties of polymers. On the one hand, high molecular weights are generally desirable from the consideration of the mechanical properties of the article ultimately formed therefrom; on the other hand, however, higher molecular weights tend to make processing and fabrication from the melt more difficult. In the molten state, polymer chains can move freely, though often with enormous viscosity, past one another if a sufficient force is applied. The fabrication of most polymeric articles utilizes this principle, and this is the chief example of the plasticity from which the very name "plastics" is derived.

The single most important structural variable determining the flow properties of polymers is molecular weight, and for most polymers, the viscosity increases with increasing molecular weights. Theories based on the considerations of molecular structure and viscoelasticity have been combined with the concepts of entanglement of long molecules, and successfully used in predicting the molecular weight dependence of viscous flow, for example, in J. D. Ferry, *Viscoelastic Properties of Polymers*, 3rd. ed., John Wiley & Sons, New York (1980). Although exact numerical agreement is not always achieved, the qualitative situation seems extremely satisfactory. In the conceptual scheme of entanglement coupling, the most important parameter is the average molecular weight between coupling loci, also referred to as the entanglement molecular weight, $M_e$. This entanglement spacing can be considered as a measure of the spacing between topological restraints which may not have a clear physical definition, but nevertheless can be assigned a numerical value from which various viscoelastic properties can be estimated. Various methods for estimating the value of $M_e$ are set forth, for example, in Ferry at pp. 372-377, and include integration of retardation spectrum or loss compliance.

Generally speaking, the log shear viscosity (log $\eta_0$) increases linearly with the log of the weight average molecular weight (log $M_w$) of the polymer up to a molecular weight corresponding to about the value for 2 $M_e$. As the molecular weight increases above 2 $M_e$, the polymer molecules begin to become entangled and log $\eta_0$ increases dramatically as illustrated in FIG. 1. As far as Applicant is aware, maintaining the linear relationship between log $\eta_0$ and log $M_w$ substantially above 2 $M_e$ of a polymer has not been achieved heretofore.

From U.S. Pat. No. 3,235,626 to Waack, it is known to use vinyl terminated macromonomers in forming graft copolymers. In this patent, a macromonomer is prepared by reacting a vinyl metal compound with an olefinic monomer to obtain a vinyl terminated macromonomer. After protonation and catalyst removal, the prepolymer is dissolved in an inert solvent with a polymerization catalyst and is subsequently reacted with either a different polymer having a reactive end group, or a different vinyl monomer under free radical conditions. This technique suffers from two major limitations: (1) though the use of vinyl lithium ensures that each polymer chain has one vinyl end group, vinyl lithium is one of the slowest anionic polymerization initiators, and results in a very broad molecular weight distribution wherein the ratio $M_w/M_n$ is greater than 2, a consequence of the ratio of the overall rate of propagation of the styryl anion to that of the vinyl lithium initiation, with the result that graft copolymers prepared from these macromonomers cannot provide a uniform side chain molecular weight; and (2) substituted vinyl compounds do not generally polymerize to high conversions and the conversion decreases as the length of the side chain increases. Conversions of 50 percent, although relatively high for most substituted vinyls, means that the resulting graft copolymers contain 50 percent unreacted macromonomer which, for most applications, is unacceptable.

An alternative route, controlled termination of living polymers, is known from U.S. Pat. No. 3,989,768 to Milkovich et al., and Milkovich et al., *J. Appl. Polym. Sci.*, vol. 27, p. 4773 (1982). These references describe anionic polymerization of a number of monomers of active initiators to form monodisperse living polymer chains. These living chains are then reacted with a wide range of termination agents to introduce substantially end-functionalized macromonomers. Although this route clearly improves the resulting macromer polydispersity and allows for a broader range of end-functionalities, it nonetheless introduces an uncertainty into the "purity" or "cleanness" of the end functional groups since one can no longer be assured that each and every chain has one functional group. Although each step in the preparation of such end-functionalized macromonomers can separately be about 95 percent in yield, the steps together produce a polymer that is, at best, only 80 to 90 percent end-functionalized.

The most informative characterization of graft copolymers produced using the Milkovich-type macromers comes from an analysis of the graft copolymers produced thereby. In Huang et al., *J. Poly. Sci.: Part A: Poly Chem. Ed.*, vol 24, pp. 2853-2866 (1986), the vinyl terminated macromer described in Milkovich '768 was utilized to prepare graft copolymers of ethylene and propylene. The best conversions for vinyl terminated polystyrene macromers with a moderate molecular weight and useful feed composition in the range of 10 to 30 weight percent on ethylene-propylene copolymer was 40 percent.

In view of this prior art, it would be highly desirable to devise a means for preparing macromers wherein the guaranteed functionality introduced in the initiation step is combined with a more active polymerizable group.

The preparation and use of copolymers of styrene and isobutylene is known in the art. Thus, such copolymers ranging from tough, glassy high polystyrene content copolymers for use in plastic blends, to rubbery low styrene isobutylene copolymers for use as impact modifiers, etc., have become well known in this art. Styrene and isobutylene have been copolymerized rather readily in the past under cationic polymerization conditions to yield these copolymers covering the entire compositional range. It is also known that blocky or random homogeneous copolymers can be produced by altering the copolymerization conditions, such as shown in Powers, U.S. Pat. No. 3,948,868. This patent thus describes the production of random homogeneous polymers comprising at least two cationically polymerizable monomers such as isobutylene and styrene. This disclosure also includes a lengthy list of various olefinic compounds including isobutylene, styrene, α-methylstyrene and other such compounds. Furthermore, these compounds have been used in a variety of applications, including use as adhesives in connection with other materials taking advantage of the surface characteristics of the polyisobutylene sequences, as coatings, as asphalt blends, and in various plastic blends. As is discussed in the '868 patent, it is also well known to produce terpolymers including isoprene, but doing so reduces the overall polymer molecular weight rendering the production of high molecular weight polymers therefrom difficult, and complicating the overall production sequence.

There have also been attempts to produce various functionalized polymers. For example, Hankey et al., U.S. Pat. No. 3,145,187, discloses polymer blends which include a vinyl chloride polymer, a surfactant, and a chlorinated olefin polymer, and the latter is said by this patentee to include copolymers of various materials which can include isobutylene and styrene, as well as ring-alkyl styrenes, among a large number of other compounds, which olefin polymers can then be chlorinated by known methods.

The literature has also disclosed other routes for obtaining copolymers of isobutylene and styrene, such as that shown in Powers et al., U.S. Pat. No. 4,074,034, which discloses the copolymerization of isobutylene with halomethylstyrene. This technique requires the use of vinylbenzyl chloride and the like as starting material, and utilizes a specified continuous solution process with solvent or mixed solvent systems in which the monomers are soluble under specified conditions. Aside from the need to employ the expensive vinylbenzyl chloride starting material, these processes also have limitations in terms of the quantity of aromatic chloromethyl functionality which can be incorporated in this manner without encountering excessive chain branching and gel formation during polymerization and polymer recovery because of the reactivity of the benzylic chlorine under cationic polymerization conditions. See, "Isobutylene copolymers of vinylbenzyl chloride and isopropenylbenzyl chloride," *Journal of Applied Polymer Science*, vol. V, Issue No. 16, pp. 452–459 (1969) in which the aromatic monomer is said to be a mixture of the para and meta isomers.

Therehas also been some interest in the halomethylation of isobutylene/styrene copolymers, such as discussed in a paper by Sadykhov, et al. entitled "Chloromethylation of an Isobutylenestyrene Copolymer and Some of Its Chemical Reactions," *Acerb. Neft. Khoz.*, 1979 (6) 37–9.

In an article by Harris, et al. entitled "Block and Graft Copolymers of Pivalolactone . . . ", Macromolecules, 1986, vol. 19, pp. 2903–2908, the authors discuss the copolymerization of isobutylene with styrene and preferably a ring-methylated styrene. This article specifically discloses copolymerization with vinyl toluene, comprising a mixture of meta- and para-methylstyrene in approximately 65/35 amounts, and with para-methylstyrene, for the purpose of producing thermoplastic elastomer pivalolactone copolymer systems with no autooxidizable aliphatic unsaturation. The article fails to recognize any difference between the use of vinyl toluene and para-methylstyrene, and in any event, even when it employs the latter, it employs conditions which result in copolymers having the properties, including heterogeneous compositional distribution and very broad molecular weight distribution for the unfractionated copolymer, as set forth in Tables 4 and 5, which include an $M_n$ for the unfractionated copolymer of 16,000, and $M_w/M_n$ of 17.45 therefor, and a 4-methylstyrene content in the polymer which varies considerably from the monomer feed and varies significantly as a function of molecular weight.

Finally, there are also articles which discuss copolymers of isobutylene and para-methylstyrene without discussing any method for preparing them. These articles include Sadykhov, et al. "Studies of Oxidative Thermal Degradation of Copolymers of Isobutylene with m- and p-Methylstyrenes in a Solution of Mineral Oils," *Uch. Zap. Azerb. Un..t. Ser. Khum.*, 1975 (304), 87–92, and other such articles. Furthermore, in Toman, et al., "Isobutylene Polymers and Copolymers with Controlled Structure", App. 78/7, 339, (Nov. 10, 1978), there is reference to the copolymerization of isobutylene with vinyl aromatic monomers. The search has thus continued for useful molecular weight copolymers of isobutylene and alkyl styrenes, and in particular for functionalized copolymers of this type which can be crosslinked, and otherwise used in a variety of applications.

Polymers with a saturated hydrocarbon backbone are well known to possess good environmental and aging resistance which makes them highly desirable in a variety of applications. Furthermore, rubbery copolymers containing major amounts of polyisobutylene are well known to possess low permeability, unique damping properties, and low surface energy which makes them particularly highly desired in many applications. However, the "inertness" of these saturated hydrocarbon polymers, their low reactivity and incompatibility with most other materials, and the difficulties in adhering them to, or using them in conjunction with most other materials has restricted their use in many areas.

In commonly assigned U.S. Ser. No. 441,575, filed Nov. 22, 1989, which is a continuation-in-part of copending U.S. Ser. No. 416,503 filed Oct. 3, 1988, which is a continuation-in-part of co-pending U.S. Ser. No. 199,665 filed May 27, 1988; and co-pending U.S. Ser. No. 416,713 filed Oct. 3, 1989, which is a continuation-in-part of U.S. Ser. No. 199,665 filed May 27, 1988; the disclosures of which are hereby incorporated by reference, it was theorized that the introduction of controlled amounts of the desired specific functionality as pendant groups on the saturated hydrocarbon backbone would greatly extend usefulness by permitting these polymers to be adhered to other surfaces and/or be co-reacted with or compatibilized with other functional polymers by "grafting" or crosslinking reactions. It was further theorized that the introduction of pendant functionality of the right type and amounts would permit these saturated hydrocarbon polymers to be "painted" or coated with other materials or to be used as coating on other materials and/or to be laminated with or dispersed in other materials to yield composite materials with a desired combination of properties.

As has been already pointed out, the fact that benzylic halogen functionality constitutes a very active electrophile that can be converted to many other functionalities via $S_N2$ nucleophilic substitution reactions has long been recognized and the chemical literature is replete with examples of these reactions. "Clean" conversions in high yield to many functionalities, including the following have been reported: aldehyde, carboxy, amide, ether, ester, thioester, thioether, alkoxy, cyanomethyl, hydroxymethyl, thiomethyl, aminomethyl, cationic ionomers (quaternary ammonium or phosphonium, S-isothiouronium, or sulfonium salts), anionic ionomers (sulfonate and carboxylate salts), etc. In addition, the literature described many examples in which a benzylic halogen is replaced by a cluster of other functionalities by nucleophilic substitution with a multifunctional nucleophile such as: triethanol amine, ethylene polyamines, malonates, etc.

Nearly all of this previous work has been with simple, small (i.e. non-polymeric) molecules containing the aromatic halomethyl (or benzylic) functionality. However, a considerable amount of art also exists on nucleophilic substitution reactions involving chloromethyl styrene and polystyrenes containing aromatic chloromethyl groups to introduce other functionalities. Much of this work involves reactions with "styragels" or lightly crosslinked polystyrenes containing various amounts of benzylic chlorine, and while many of the same nucleophilic substitution reactions previously reported for small molecules containing benzylic chlorine have been achieved in "styragels", it has been necessary to modify reaction conditions and in particular to often employ phase transfer catalysts in order to promote the desired substitution reaction. Reactions involving the benzylic chlorine in polystyrene have been more difficult to achieve than in simple small molecules because of the greater difficulty in achieving the intimate contact required between the reactants when one of the reactants (the aromatic chloromethyl moiety) is in a separate polymeric phase from the other reactant. Yields have also generally been lower and side reactions are more prevalent in the reactions involving the benzylic chlorine in polystyrene. However, since most of the work has been with "styragels", it has generally not been necessary to achieve high conversion in "clean" substitution reactions in order to preserve polymer solubility. Good recent review of this work involving chloromethyl styrene and "styragels" containing benzylic chlorines are in the literature (see Marcel Camps et al., in "Chloromethylstyrene: Synthesis, Polymerization, Transformation, Applications" in *Rev. Macromol. Chem. Physics*, C22(3), 343-407 (1982-83) and JMJ Frechet in "Chemical Modification of Polymers via Phase Transfer Catalysts" in *Crown Ethers and Phase Transfer Catalysts in Polymer Science*, edited by Matthews and Canecher and Published by Plenum Press, New York, 1984, and Jean-Pierre Montheard, et al. in "Chemical Transformations of Chloromethylated Polystyrene" in *JMS-Rev. Macromol. Chem. Phys.*, C-28 (3 & 4) pp. 503–592 (1988).

Previous workers have not applied nucleophilic substitution reactions to isobutylene/para-bromomethylstyrene/para-methylstyrene terpolymers to produce versatile, substantially saturated, pendant functionalized, soluble copolymers.

SUMMARY OF THE INVENTION

Applicants have discovered a polymer architecture which inhibits macromolecular entanglement. The architecture involves the use of side chains having a low enough molecular weight to prevent side chain entanglement, and also wherein the side chains have a high enough molecular weight and are spaced along the backbone frequently enough to prevent main chain entanglements. Accordingly, the invention provides an ultra low viscosity macromolecular system having advantages in adhesives, sealants, inks and coatings applications, to name a few, due to the low viscosity above the processing temperature of the main chain polymer.

In one aspect, the invention broadly provides a polymer, comprising macromolecules having an entanglement-inhibiting architecture, including a main chain and a plurality of side chains distributed along the main chain. The weight average molecular weight of segments of the main chain between the adjacent side chains ($M_{MCS}$) is in the range of from about 0.02 $M_e^A$ to about 2 $M_e^A$, preferably above about 0.1 $M_e^A$, and especially above about 0.5 $M_e^A$, wherein $M_e^A$ is the entanglement weight average molecular weight of the main chain. The side chains have a weight average molecular weight ($M_w^B$) in the range of from about 0.02 $M_e^B$ to about 2 $M_e^B$, preferably above about 0.1 $M_e^B$, and especially above about 0.5 $M_e^B$, wherein $M_e^B$ is the entanglement weight average molecular weight of the side chains.

In accordance with a preferred embodiment of the architecture of the present invention, the weight average molecular weight of the main chain $M_w^A$ is at least about 3 $M_e^A$, more preferably at least about 5 $M_e^A$, and most preferably at least about 10 $M_e^A$. For most polymers, the main chain molecular weight will ordinarily be at least about 25,000, preferably at least about 50,000, and more preferably at least about 100,000. In addition, the main chain desirably has a narrow molecular weight distribution as reflected in the ratio of weight average molecular weight $M_w^A$ to number average molecular weight ($M_n^A$), or $M_w^A/M_n^A$ of less than about 6, more preferably less than about 4, even more preferably less than about 2.5, and most preferably less than about 2. In one preferred embodiment of the architecture, $M_e^A$ is preferably greater than about 1,000. The side chains preferably have a narrow molecular weight distribution such that the ratio $M_w^B/M_n^B$ is less than about 6, more preferably less than about 2, even more preferably less than about 1.5, most preferably less than about 1.1 and especially in the range of from 1.0 to about 1.05. In addition to the foregoing parameters, the average number of side chains attached to each main chain is preferably from about 2 to about 200, more preferably from about 3 to about 100, and most preferably from about 4 to about 80.

In one embodiment, the main chain comprises a copolymer of an isoolefin having from about 4 to about 7 carbon atoms and a para-alkylstyrene wherein the main chain polymer has a substantially homogeneous compositional distribution. The side chains are distributed along the main chain and are attached to para-alkyl groups of the main chain para-alkylstyrenes. The side chains comprise macromonomers selected from anionically polymerizable monomers, such as, for example, polystyrene, polyisoprene, polypropylene, poly(phenylene oxide), and the like. In a preferred embodiment, the isoolefin comprises isobutylene, and the para-alkylstyrene comprises para-methylstyrene.

In a preferred embodiment, large molecule macromonomers with molecular weights > 1000 and incorporating terminal nucleophilic groups undergo a nucleophilic substitution reaction between the terminal nucleophiles and the benzylic halide leaving groups attached to para-methylstyryl moieties. The product of this reaction is a macromolecule having a main chain comprising the isobutylene/para-methylstyrene/para-bromomethyl-styrene/"base" terpolymer and a highly selected number of grafted large molecule side chains extending from several of the para-methylstyryl groups.

Large molecule macromonomers with molecular weights > 1000 incorporating terminal nucleophiles are preferably monodisperse, that is a $M_w/M_n$ approaching 1.05 with a strictly controlled molecular weight and 99.9 percent terminated with the selected nucleophilic functionality. Such monomers are the product of carefully conducted polymerizations such as anionic polymerization mechanisms where linear polymerizations may be conducted so that chain transfer does not occur. Chain centers are stable, "living" molecules, and termination by a suitable compound containing nucleophilic functionality incorporates a nucleophile into the last segment of the polymer chain. Alternatively, in some anionically conducted polymerization initiated by organolithium compounds, functionalization may be incorporated into the initial chain segment by utilizing an organolithium compound having a protected functional group. Functionalized macromonomers polymerized under anhydrous conditions in a hydrocarbon solvent generally exhibit the necessary molecular weight structure and homogeneous composition.

In an alternate embodiment, the entanglement-inhibiting architecture is provided as the copolymerization reaction product of an α-olefin and a monoolefinically terminated macromonomer. In this embodiment, the α-olefin is preferably ethylene, propylene or a combination thereof, and the monoolefinically terminated macromonomer is preferably a norbornene terminated, anionically polymerized monomer of high purity, such as, for example, styrene, para-methylstyrene, α-methylstyrene and the like. The preferred norbornene-terminated macromonomers can be employed in very high purity, for example, at least 98 percent norbornene terminated, preferably at least 99 percent, more preferably at least about 99.5 percent, and most preferably at least about 99.9 percent purity. Furthermore, the molecular weight of the side chains can be very tightly controlled through the preferred use of macromonomers having a very narrow molecular weight distribution, such as, for example, a ratio of $M_w/M_n$ less than 2.0, preferably less than 1.5, more preferably less than about 1.1, and especially in the range of from 1.0 to about 1.05.

In a preferred embodiment a norbornene terminated polystyrene or poly(para-methylstyrene) macromonomer is polymerized together with ethylene and propylene monomers in a continuous hexane solution polymerization utilizing a Ziegler-type coordination-complex initiator. The norbornene-polystyrene feed stream is a cyclohexane solution and the norbornene-poly(-para-methylstyrene) is a hexane or heptane solution. In such a preferred process, there is 90 percent macromonomer conversion indicative of the high reactivity of norbornene in most Ziegler type processes. The resulting polymer contains little unreacted macromonomer and therefore can be incorporated at widely varying concentrations. Also, there is no loss of catalytic activity of the Ziegler type initiator, constant yield between about 30° C. and about 60° C. and product recovery at conventional ethylene/propylene copolymerization conditions.

With respect to this isoolefin/para-alkylstyrene copolymer main chain embodiment, the invention also provides a method of synthesizing a polymer having an entanglement-inhibiting architecture. The method includes the steps of: (a) preparing a copolymer main chain of an isoolefin having from about 4 to about 7 carbon atoms and a para-alkylstyrene having a substantially homogeneous compositional distribution; (b) halogenating the para-alkylstyrene in said copolymer; (c) introducing side chains attached to the para-alkyl groups by contacting said halogenated copolymer with a mononucleophilically terminated macromonomer to nucleophically substitute the macromonomer as the side chains at said halogenated para-alkylstyrene groups, wherein an average molecular weight of segments of the copolymer main chain between the attached side chains is from about 0.02 $M_e{}^A$ to about 2 $M_e{}^A$, wherein $M_e{}^A$ is the entanglement molecular weight of the main chain, and wherein the macromonomer side chains have an average molecular weight from about 0.02 $M_e{}^B$ to about 2 $M_e{}^B$, wherein $M_e{}^B$ is the entanglement molecular weight of the mononucleophilically terminated macromonomer.

BRIEF DESCRIPTION OF THE DRAWINGS

FIG. 2 is log-log plot of complex viscosity versus frequency at 170° C. for several grafted polymers of the present invention (see Examples 8-11 below) compared to a main chain polymer without side chain grafts (see Comparative Example 4 below).

DETAILED DESCRIPTION OF THE INVENTION

I. Entanglement-Inhibited Macromolecules

Figure 1:
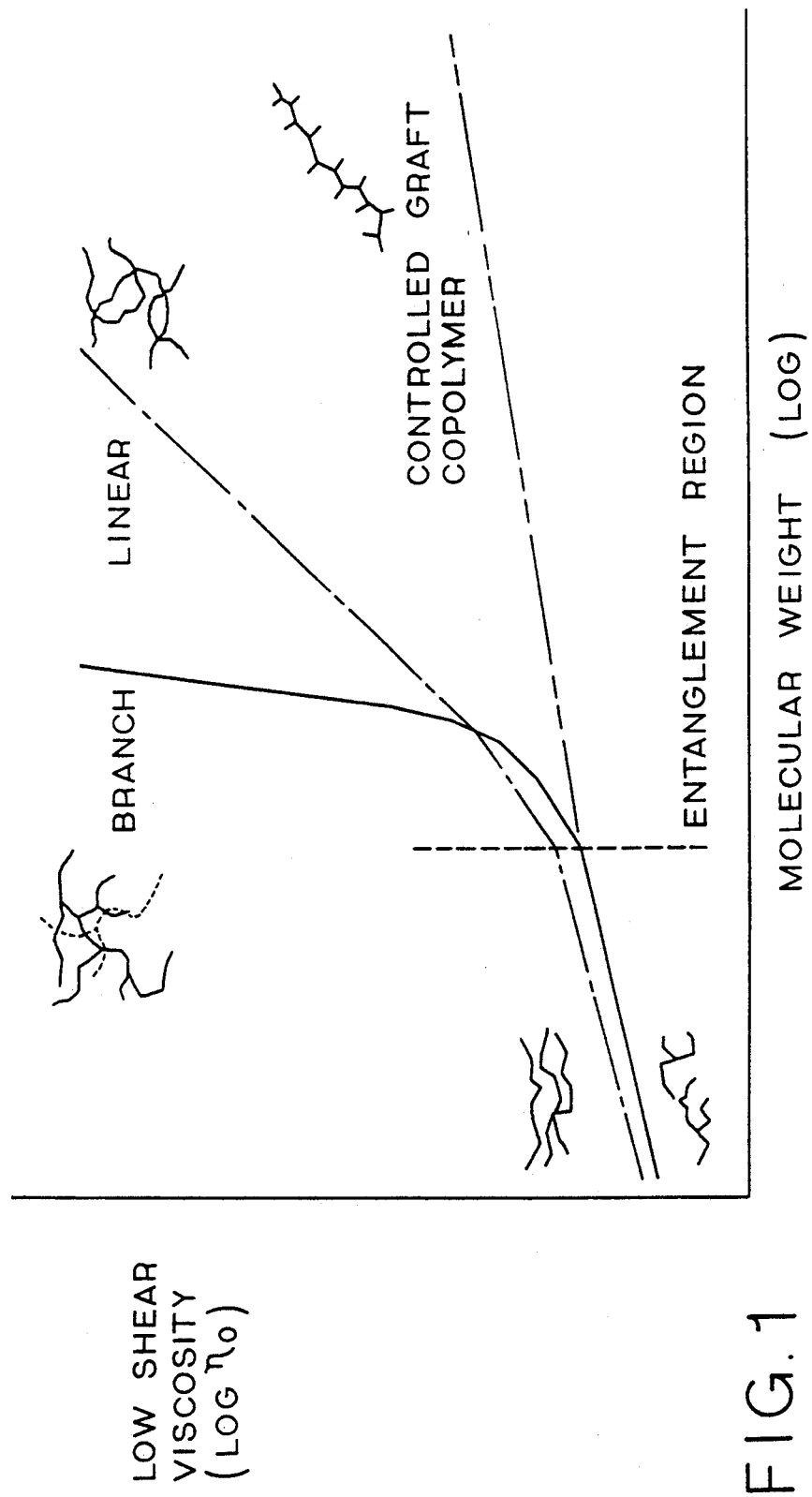
FIG. 1 is a general qualitative log-log plot of viscosity versus molecular weight for prior art linear and branched polymers compared with polymers having the entanglement-inhibiting architecture of this invention.

The grafted copolymer comprises macromolecules having an entanglement-inhibiting architecture, including a main chain and a plurality of side chains distributed along the main chain. The weight average molecular weight of segments of the main chain between the adjacent side chains ($M_{MCS}$) is in the range of from about 0.02 $M_e{}^A$ to about 2 $M_e{}^A$, preferably above about 0.1 $M_e{}^A$, and especially above about 0.5 $M_e{}^A$, wherein $M_e{}^A$ is the entanglement weight average molecular weight of the main chain. The side chains have a weight average molecular weight ($M_W{}^B$) in the range of from about 0.02 $M_e{}^B$ to about 2 $M_e{}^B$, preferably above about 0.1 $M_e{}^B$, and especially above about 0.5 $M_e{}^B$, wherein $M_e^B$ is the entanglement weight average molecular weight of the side chains. Table 1 shows calculated $M_e$ values for several common polymers.

TABLE 1

| POLYMER | TEMP. (°C.) | ESTIMATED $M_e$ |
|---|---|---|
| Methylmethacrylate | 170 | 4,700 |
| Styrene-Butadiene | 25 | 3,000 |
| Butyl Rubber | 25 | 8,500 |
| Ethylene-Propylene | 25 | 1,660 |
| Ethylene | 190 | 1,250 |
| Isobutylene | 25 | 7,600–8,900 |
| Styrene | 140–160 | 17,300–18,100 |
| α-Methylstyrene | 186 | 13,500 |
| Vinyl Acetate | 60 | 9,100 |
| Isobutylene-Para-methylstyrene | 25 | 9,600–11,400 |
| Acrylic Acid | 170 | 4,000 |

In accordance with a preferred embodiment, the weight average molecular weight of the main chain $M_w^A$ is at least about 3 $M_e^A$, more preferably at least about 5 $M_e^A$, and most preferably at least about 10 $M_e^A$. For most polymers, the main chain molecular weight will ordinarily be at least about 25,000, preferably at least about 50,000, and more preferably at least about 100,000. In addition, the main chain desirably has a narrow molecular weight distribution as reflected in the ratio of weight average molecular weight $M_w^A$ to number average molecular weight ($M_n^A$), or $M_w^A/M_n^A$ of less than about 6, more preferably less than about 4, even more preferably less than about 2.5, and most preferably less than about 2. In one preferred embodiment of the architecture, $M_e^A$ is preferably greater than about 1,000.

The side chains preferably have a narrow molecular weight distribution such that the ratio $M_w^B/M_n^B$ is less than about 6, more preferably less than about 2, even more preferably less than about 1.5, most preferably less than about 1.1 and especially in the range of from 1.0 to about 1.05. In addition to the foregoing parameters, the average number of side chains attached to each main chain is preferably from about 2 to about 200, more preferably from about 3 to about 100, and most preferably from about 4 to about 80.

In another preferred embodiment, the weight average molecular weight of the main chain $M_w^A$ is less than about 25,000, preferably from about 300 to about 10,000 and side chain molecular weight $M_w^B$ ranges from about 0.02 $M_e^B$ to about $M_e^B$, the side chain entanglement molecular weight. The weight average molecular weight of the segments of the main chain between adjacent side chains ($M_{MCS}$) is in the range of from about 0.02 $M_e^A$ to about 2 $M_e^A$ as previously described. Such preferred low molecular weight entanglement-inhibited "brush polymers" have low melt viscosity and are generally crosslinked upon application by methods known in the art. One exemplary crosslinking method is radiation activated curing. In a further preferred embodiment, the entanglement-inhibited polymers of the present invention comprise addition functionality suited in one example for radiation curing. Such radiation-reactive functionality may be distributed along either the main chain or the side chain segments.

In one embodiment, the main chain comprises a copolymer of an isoolefin having from about 4 to about 7 carbon atoms and a para-alkylstyrene wherein the main chain polymer has a substantially homogeneous compositional distribution. The side chains are distributed along the main chain and are attached to para-alkyl groups of the main chain para-alkylstyrenes.

In a preferred embodiment, large molecule macromonomers with molecular weights >1000 and incorporating terminal nucleophilic groups undergo a nucleophilic substitution reaction between the terminal nucleophiles and the benzylic halide leaving groups attached to para-methylstyryl moieties. The product of this reaction is a macromolecule having a main chain comprising the isobutylene/para-methylstyrene/para-bromo-methylstyrene "base" terpolymer and a highly selected number of grafted large molecule side chains extending from several of the para-methylstyryl groups.

Large molecule macromonomers with molecular weights >1000 incorporating terminal nucleophiles are preferably monodisperse, that is a $M_w/M_n$ approaching 1.0–1.05 with a strictly controlled molecular weight and 99.9 percent terminated with the selected nucleophilic functionality. Such monomers are the product of carefully conducted polymerizations such as anionic polymerization mechanisms where linear polymerizations may be conducted so that chain transfer does not occur. Chain centers are stable, "living" molecules, and termination by a suitable compound containing nucleophilic functionality incorporates a nucleophile into the last segment of the polymer chain. Alternatively, in some anionic polymerization initiated by organolithium compounds, functionalization may be incorporated into the initial chain segment by utilizing an organolithium compound having a protected functional group. Functionalized macromonomers polymerized under anhydrous conditions in a hydrocarbon solvent generally exhibit the necessary molecular weight structure and homogeneous composition.

In another embodiment, the main chain comprises a polymer of one or more simple olefin monomers polymerized by any of the standard polymerization techniques and the side chains are grafted onto pendant functional groups distributed within the main chain backbone. Such grafting techniques are well known including, transesterification, nucleophilic substitution, condensation, and the like. In a preferred embodiment, side chains comprise macromonomers having terminal vinyl functionality which are copolymerized with main chain monomers in the main chain polymerization step. The monoolefinically terminated macromonomer is preferably a norbornene terminated, anionically polymerized monomer of high purity, such as, for example, styrene, para-methylstyrene, α-methylstyrene and the like. The preferred norbornene-terminated macromonomers can be employed in very high purity, for example, at least 98 percent norbornene terminated, preferably at least 99 percent, more preferably at least about 99.5 percent, and most preferably at least about 99.9 percent purity. Furthermore, the molecular weight of the side chains can be very tightly controlled through the preferred use of macromonomers having a very narrow molecular weight distribution, such as, for example, a ratio of $M_w/M_n$ less than 2.0, preferably less than 1.5, more preferably less than about 1.1, and especially in the range of from 1.0 to about 1.05.

In a most preferred embodiment a norbornene terminated polystyrene or poly(para-methylstyrene) macromonomer is polymerized together with ethylene and propylene monomers in a continuous hexane solution polymerization utilizing a Ziegler-type coordination-complex initiator. The norbornene-polystyrene feed stream is a cyclohexane solution and the norbornene-poly(para-methylstyrene) is a hexane or heptane solution. In such a preferred process, there is 90 percent macromonomer conversion indicative of the high reactivity of norbornene in most Ziegler-type processes. The resulting polymer contains little unreacted macromonomer and therefore can be incorporated at widely varying concentrations. Also, there are no loss of catalytic activity of the Ziegler-type initiator, constant yield between about 30° C. and about 60° C. and product recovery at conventional ethylene/propylene copolymerization conditions.

II. Entangelement-Inhibited Isoolefin/Para-Alkylstyrene/Para-Bromoalkylstyrene Macromolecules

A. Macromonomer Grafted Copolymer (by Nucleophilic Addition)

The grafted copolymers in this embodiment having entanglement inhibited architecture can be characterized as a macromonomer grafted, nucleophilically substituted, halogenated copolymer of an isoolefin and para-alkylstyrene copolymer which includes the para-alkylstyrene as:

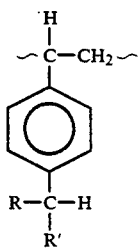
(1)

or as:

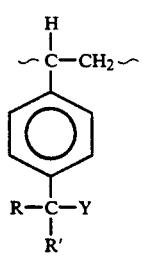
(2)

or as:

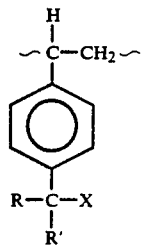
(3)

-continued

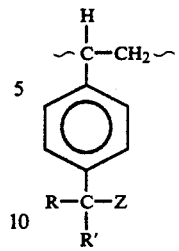
(4)

or as a mixture of (1), (2), and/or (3) and/or (4); wherein R and R' are independently selected from the group consisting of hydrogen, alkyl, preferably $C_1$ to $C_5$ alkyl, and primary or secondary alkyl halides, preferably primary or secondary $C_1$ to $C_5$ alkyl halides; X is selected from the group consisting of chlorine and bromine, preferably bromine; Y represents a new macromonomer grafted side chain preferably attached to the polymer via nucleophilic substitution of one of the benzylic halogens; and Z represents an optional additional functional group or groups attached to the polymer via nucleophilic substitution of one of the benzylic halogens which may be radiation-curable, for example.

In one embodiment, the macromonomer grafted copolymer of the present invention is a nucleophilically-substituted halogenated copolymer of an isoolefin and para-alkylstyrene which includes the para-alkylstyrene as:

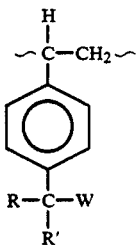

wherein W includes at least Y, and may optionally include a mixture of Y and one or more of hydrogen, X and Z, wherein R, R', X, Y and Z are as defined above. The macromonomer grafted para-alkylstyrene side chains (wherein W is Y) may comprise from about 0.5 to about 55 mole percent of the para-methylstyrene, preferably from about 0.5 to about 20 mole percent, more preferably from about 0.5 to about 15 mole percent, and especially from about 1 to about 7 mole percent of the para-methylstyrene. The unsubstituted para-alkylstyrene (wherein W is hydrogen) may comprise from about 0.5 to about 90 weight percent of the precursor copolymer, preferably from about 1 to about 20 weight percent and especially from about 2 to about 10 weight percent. The radically halogenated para-alkylstyrene (wherein W is X) may comprise up to about 55 mole percent of the para-methylstyrene, preferably less than about 20 mole percent, more preferably less than about 15 mole percent of the para-methylstyrene. In a preferred embodiment, the halogenated para-alkylstyrene is only partially converted, for example, by nucleophilic substitution thereof by Y and/or Z groups, so that the macromonomer grafted copolymer also includes ungrafted halogenated para-alkylstyrene preferably comprising from about 50 to about 200 percent of the grafted para-alkylstyrene moiety. Functionalized paraalkylstyrene (wherein W is Z) may comprise from 0 to about 55 mole percent of the para-methylstyrene, preferably from 0 to about 20 mole percent, more preferably from 0 to about 15 mole percent of the para-methylstyrene. The remainder of the copolymer generally comprises the isoolefin which usually ranges from about 10 to about 99.5 weight percent of the precursor copolymer, preferably from about 80 to about 99 percent by weight, more preferably from about 90 to about 98 weight percent.

The grafted copolymer comprises macromolecules having the entanglement-inhibiting architecture, as described previously including a main chain and a plurality of side chains distributed along the main chain.

In accordance with a preferred embodiment, the weight average molecular weight of the main chain and the narrow molecular weight distribution of the side chains is described previously.

The presence of other functionality is optional and may be either interdispersed on a single grafted base copolymer to which additional functional groups have been attached to ungrafted halogenated para-alkylstyrene or two or more grafted and/or functionalized copolymers may be blended together. The presence of the additional functionality enables other desirable properties to be incorporated into an adhesive system. For example, the presence of radiation-reactive functionality can facilitate crosslinking of the polymer having enhanced processing properties in radiation curable adhesives.

As another example of additional functionality, certain silane functional groups can act to enhance adhesion to certain substrates such as glass.

B. Preparation of Nucleophilically Terminated Macromonomers

To obtain the entanglement-inhibiting architecture of the present invention, attached side chains are preferably of uniform length. It is highly desirable, therefore that macromonomers be prepared by polymerization methods whereby dispersity and chain length may be controlled. In addition, macromonomers should incorporate a single terminal nucleophilic functional group and are desirably essentially free of non-functionalized and non-terminally functionalized macromonomers. Anionic polymerization techniques are well suited to prepare such macromonomers.

Macromonomers generally have the form of a polymeric kernel including a terminal segment nucleophile, however, alkali or alkaline earth metal salts or ammonium and alkyl substituted ammonium salts of such nucleophilically terminated macromonomers are also suitable.

Monomers suited for anionic polymerization are well known and the present invention contemplates the use of all such polymerizable compounds. Preferred anionically polymerizable monomers include vinyl aromatics such as styrene, p-methylstyrene, α-methylstyrene, α-vinylnaphythlene, 3-vinyl toluene, divinylbenzene, and the like; lower acrylate and methacrylate esters including methyl methacrylate, methyl acrylate and the like; acrylonitrile; α-olefin unsaturated carboxylic acids such as acrylic acid, methacrylic acid, and the like; α-olefin unsaturated dicarboxylic acids and anhydrides such as maleic acid, maleic anhydride, itaconic acid, citraconic acid, and the like; vinyl pyridines; vinyl unsaturated amides such as acrylamide, methacrylamide, N,N-dialkylacrlyamide, and the like; acenaphthalene; 9-acrylcarbazole; organic isocynates; copolymers with monomers such as 1,1-diphenylethylene which do not homopolymerize; and random and block copolymers of the above; elastomeric forming monomers such as isoprene and butadiene. Other such anionically polymerizable monomers are disclosed in *Macromolecular Reviews*, vol. 2, pages 74–83, Interscience Publishers, Inc. (1967) and in *Anionic Polymerization*, ACS Symposium Series 166, page 60, American Chemical Society (1981) which is hereby incorporated herein by reference.

When conducting anionic polymerizations, initiator type, reaction medium and reaction conditions are strongly dependent upon the monomer polymerized. Initiators generally comprise organometallic compounds derived from alkali metals such as, for example n-butyllithium, sec-butyllithium, and the like. Other suitable initiator is described in U.S. Pat. No. 3,786,116 to Milkovich et al. which is hereby incorporated herein by reference.

The polymerization process is typically conducted in a polar or non-polar organic solvent. Suitable solvents do not contain active hydrogen and act primarily as diluents for diminishing solution viscosity as the polymerization progresses. Examples of these solvents include benzene, toluene, cyclohexane, tetrahydrofuran, carbon disulfide, ethylene dichloride, trichloroethane, ISOPAR solvents, naphtha, and the like. Selection of solvent should desirably be undertaken with regard to the grafting step which follows to avoid having to isolate the macromonomer prior to the grafting thereof onto the halogenated precursor copolymer.

A small amount of a polar activator may be utilized to increase the polymerization rate or propagation rate without increasing the rate of undesirable side reactions or broadening the molecular weight ratio. Examples of polar activators include ethers principally tetrahydrofuran and amines principally N,N,N',N'-tetramethylethylenediamine.

The temperature of polymerization may be conducted over a wide range of temperatures, generally from about $-80°$ C. to about $100°$ C., depending on the rate of reaction, viscosity considerations, reaction heat, and the like. Polymerization of styrene may be conducted between about $25°$ C. and about $70°$ C. in cyclohexane, toluene or benzene utilizing n-butyllithium. However, anionic polymerizations of lower methacrylate esters, for example, are preferably carried out at a lower temperature, from about $-80°$ C. to about $-50°$ C. in a polar solvent like tetrahydrofuran.

Process conditions including temperature, solvent type and initiator quantity are well known. Common examples are given in Milkovich col. 8-9 mentioned above. "Living polymers" produced by anionic polymerizations will continue polymerizing until unreacted monomer is gone or termination causing reactants are added. One monomer may be replaced by another to produce copolymer blocks. While the polymer chain center remains active i.e. susceptible to polymerization, it may be useful unterminated as a macromonomer as the chain growth center is a very active carbanion nucleophile.

Termination of the "living" chain centers caps each polymer chain with other nucleophilic functionality, e.g. carboxylate, alkoxide, thiolate, amide, etc. and their alkali metal salts, which are more suitable for purposes of isolating the macromonomer.

Termination is effected by the addition of the terminating agent after allowing sufficient time for conclusion of the reaction to the desired extent. Preferably, essentially all monomer is reacted into macromonomer prior to termination to avoid the presence of ungraftable impurities in the grafting step.

Following termination with the desired nucleophilic functionality, grafting reactions with the isobutylene/para-alkylstyrene/para-bromoalkylstyrene or other main chain polymer may be conducted in situ in the same solvent medium where possible. Alternatively, the functionality-capped macromonomer can be isolated in an intermediate step.

Other monomers suited for polymerization into terminally functionalized macromonomers include 2,6-disubstituted phenols which undergo oxidative coupling reactions to form aromatic polyethers. Such polymerizations are conducted by passing oxygen through a solution of the monomer in an organic solvent containing a catalytic complex comprised of a cuprous salt and an amine. For phenol monomers containing small substituents, polymerization proceeds rapidly under mild conditions. Thus 2,6-dimethylphenol polymerizes at room temperature to produce a macromonomer comprising a substantially monofunctional phenoxide nucleophile. Further description of such polymerizations may be found in H. L. Finkbeiner et al., "Polymerization by Oxidative Coupling," Schildknecht and Skeist ed., *Polymerization Processes*, Wiley-Interscience, New York, Chapter 15, (1977) which are hereby incorporated herein by reference.

Macromonomers may be polyolefins such as polyethylene, polypropylene and the like grafted with an anhydride functionality such as succinic or himic anhydride as set forth in U.S. Pat. No. 3,862,265 which is hereby incorporated herein by reference. The resulting polyolefin is substantially monofunctional with most chains containing one anhydride group at or near the end. This functionality may be converted to a suitable nuleophile by subsequent reaction of the polymer with an alcohol-base mixture.

A metal coordination complex type initiator is generally preferred for olefin type monomers such as propylene, ethylene, butene-1, and the like. These generally involve Group I-III alkyl metal compounds and a third complexing agent. A suitable transition metal component of the catalyst system is titanium trichloride in coordination with an aluminum trialkyl or aluminum alkylhalide. When the aluminum compound is the former, no complexing agent is required. When the aluminum compound is an aluminum alkylhalide or sesquihalide, a complexing compound capable of donating electrons to the aluminum alkyl dihalide is necessary. Complexing compounds include amines, ethers, nitriles and other compounds functioning as a Lewis base.

Other suitable macromonomers may be prepared from monomers which undergo ring opening polymerizations. Such reactions are cationic polymerizations in which a carbenium ion forms the basis of the chain center. Cationic polymerizations may be initiated by species such as Na, RO−, H+, and BF$_3$ and terminate upon the destruction of the cation center by either recombination with the counterion or reaction with some other species which does not propagate as is known in the art. While many aspects of cationic polymerization are similar to anionic polymerization including formation of "living chains," in cationic polymerizations, termination does not result in an end group nucleophile. Terminal nucleophilic functionalization depends upon the polymer structure i.e. the availability of —O— or —S—, for example, as in a poly(ethylene oxide) or poly(ethylene sulfide) wherein treatment of the polymer with sodium ethoxide yields a polymer with an active sodium alkoxide chain end. Such polymerizations are well known in the art and further details may be found, for example, in G. Odian, *Principles of Polymerization*, 2nd. Ed., J. Wiley & Sons, New York, pages 508–563, (1981).

C. Preparation of the Isoolefin/Para-Alkylstyrene Polymer Main Chain

This invention embodiment is, in part, based upon the discovery that the polymerization of isomonoolefin and para-alkylstyrene under certain specific polymerization conditions now permits one to produce, via halogenation and nucleophilic substitution, graft/functionalized copolymers which comprise the direct reaction product (that is, in their as-polymerized form), and which have unexpectedly homogeneous uniform compositional distributions. Thus, by utilizing the polymerization procedures set forth herein, the polymeric backbones or main chains, which are suitable for grafting with macromonomers to obtain the novel polymer architecture according to one preferred embodiment of the present invention, can be produced.

Suitable halogen-containing copolymers of a $C_4$ to $C_7$ isomonoolefin and a para-alkylstyrene in this embodiment of the present invention comprise at least 0.5 weight percent of the para-alkylstyrene moiety. For elastomeric copolymer products, the para-alkylstyrene moiety may range from about 0.5 weight percent to about 20 weight percent, preferably from about 1 to about 20 weight percent, more preferably from about 2 to about 20 weight percent of the copolymer. The halogen content of the copolymers may range from above zero to about 7.5 weight percent. The halogen may be bromine, chlorine, and mixtures thereof. Preferably, the halogen is bromine. The major portion of the halogen is chemically bound to the para-alkyl group, that is, the halogen-containing copolymer comprises para-haloalkyl groups.

The copolymers of the isomonoolefin and para-alkylstyrene useful to prepare the halogen-containing copolymers suitable for use in this embodiment of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The preferred isomonoolefin comprises isobutylene. The preferred para-alkylstyrene comprises para-methylstyrene. Suitable copolymers of an isomonoolefin and a para-alkylstyrene include copolymers having a weight average molecular weight ($M_w$) of at least about 25,000, preferably at least about 30,000, more preferably at least about 100,000. The copolymers also, preferably, have a ratio of weight average molecular weight ($M_w$) to number average molecular weight ($M_n$), i.e., $M_w/M_n$ of less than about 6, preferably less than about 4, more preferably less than about 2.5, most preferably less than about 2. The brominated copolymer of the isoolefin and para-alkylstyrene obtained by the polymerization of these particular monomers under certain specific polymerization conditions now permits one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

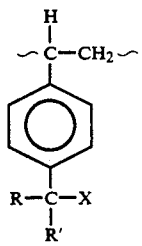

in which R and R' are independently selected from the group consisting of hydrogen, alkyl preferably having from 1 to 5 carbon atoms, primary alkyl halides, secondary alkyl halides preferably having from 1 to 5 carbon atoms, and mixtures thereof and X is selected from the group consisting of bromine, chlorine and mixtures thereof, such as those disclosed in European patent application 89305395.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about −100° C. to about −35° C., preferably from about −80° to about −40° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene, chloride, chloroform, carbon tetrachloride, methyl chloride, with methyl chloride being particularly preferred.

An important element in producing the copolymer is the exclusion of impurities from the polymerization reactor, namely, impurities which, if present, will result in catalyst poisoning or excessive molecular weight depression by complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, meta-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point of para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methylstyryl moiety in the copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer halogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azobisisobutyronitrile (AIBN), azobis(2,4-dimethylvaleryl)nitrile, azobis(2-methylbutyryl)nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene can be highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively nonreactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, e.g., AIBN or VAZO 52: 2,2'-azobis(2,4-dimethylpentanenitrile), at about 55° to 80° C., for a time period ranging from about 4.5 to about 30 minutes, followed by a caustic quench. The recovered polymer is washed in basic water wash and water/isopropanol washes, recovered, stabilized and dried.

D. Reaction of the Halogenated Base Terpolymer to Graft Glassy Side Chains and Other Functionality The molecular entanglement architecture of the polymer in this embodiment comprises the direct reaction product of the nucleophilic terminated macromonomer and the halogenated isoolefin/paraalkylstyrene polymeric main chain in a nucleophilic substitution reaction. The attachment of macromonomer grafts and, optionally, one or more different types of other functional groups allows preparation of polymers which can be radiation crosslinked, emulsified, and/or have improved adhesion to specific substrates, in addition to sprayability. Each of these attributes can be derived from the judicious choice of an appropriate functionality.

The benzylic bromine (halogen) functionality is uniquely suited, as the base from which the grafted copolymer components of this embodiment can be made, because it can be made to undergo selective nucleophilic substitution reactions with a great range of nucleophiles, so that almost any desired type and amount of functionality can be introduced without undesirable side reactions and under conditions which are mild enough to avoid degradation and/or crosslinking of the saturated copolymer backbone containing the pendant benzylic halogen functionality. Furthermore, in many instances, it is possible to only partially graft or convert the pendant benzylic halogen to another desired functionality while retaining some, or to later graft or convert another portion, of the remaining benzylic halogen functionality to yet another new functionality, so that copolymers containing mixed grafts and/or other functionalities can be made. The mixed graft-/functionality can advantageously provide unique combinations of properties, such as, for example, grafting with another functional polymer via one of the functionalities and/or crosslinking or adhering to some surface via another of the functionalities.

A benzylic halogen functionality constitutes a very active electrophile which will react under suitable conditions with any nucleophile capable of donating electrons to it. Suitable nucleophiles include those containing oxygen, sulfur, nitrogen, phosphorus, carbon, silicon, and various metals including especially magnesium, lithium, sodium, and potassium. Equally important to this versatility in types of nucleophiles which will react with the benzylic halogen functionality is the relatively mild conditions under which these nucleophilic substitution reactions proceed so that substitution reactions can be completed to introduce the desired new functionality without cleavage or crosslinking reactions involving the saturated hydrocarbon backbone of the isobutylene/para-methylstyrene copolymer.

Another of the attributes of the benzylic halogen functionality is the selectivity with which the desired substitution reactions can be made to proceed without undesirable side reactions such as complicating elimination reactions. This attribute is extremely important in reactions involving soluble high polymer components, since even a tiny amount of a side reaction which can lead to coupling may lead to gelation. In reactions involving simple molecules (which are usually monofunctional) yields of only 70 percent of the desired product may be acceptable, since purification and separation of the undesired products is relatively simple. In reactions involving already crosslinked polymers (e.g. "Styragels") lower yields to the desired product may also be acceptable, since the starting polymer is already insoluble. However, in reactions with the soluble high polymer components of this embodiment of the invention which contain many grafted and/or functional groups per molecule, it is necessary to achieve greater than 99 percent of the desired substitution reaction in order to maintain solubility during reaction and recovery. Tiny, almost insignificant (in other reactions) amounts of side reactions which produce gel may interfere with usefulness. Furthermore, purification of the substituted polymer to remove unwanted side products is usually very difficult or impossible. This is why the selective single route to high yield nucleophilic substitution reactions achievable with benzylic halogen functionality under controlled conditions is important.

In accordance with a preferred embodiment of the present invention, the nucleophilic reagents capable of donating electrons to benzyl halides and displacing a halide ion via a substitution nucleophilic displacement reaction may be Y or YM, and/or Z or ZM, wherein M is hydrogen, a metal ion, or an ammonium ion and Y is a macromonomer with mononucleophilic termination containing oxygen, sulfur, silicon, carbon, nitrogen, phosphorus, or various metals; and Z is a small molecule of <1000 molecular weight which may contain other functionality in addition to the simple nucleophile which becomes attached at the benzylic position.

Examples of suitable oxygen-containing nucleophiles which result in the attachment of —O— linkage to the benzylic position include, (but are not limited to):

—OR      as in alkoxide or phenoxide;

 as in carboxylates;

=O₃S      as in sodium salts.

Examples of suitable sulfur-containing nucleophiles which result in attachment of —S— linkage to the benzylic position include (but are not limited to):

—S—R      as in thiolates and thiophenolates;

—SR₂      as in thioethers;

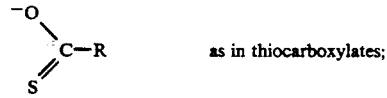 as in thiocarboxylates;

 as in dithiocarboxylates;

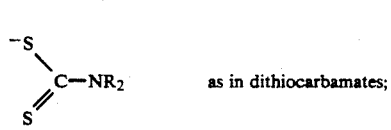 as in thioureas;

as in dithiocarbamates;

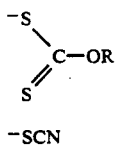 as in xanthates;

−SCN   as in thiocyanates.

Examples of silicon-containing nucleophiles which result in the attachment of —Si— linkage to the benzylic position include (but are not limited to):

| | |
|---|---|
| H—SiR$_3$ | as in silanes; |
| H—SiX$_n$R$_{3-n}$ | as in halosilanes (n = 0,1,2 or 3). |

Examples of nucleophiles which result in the attachment of —C— linkage to the benzylic position included (but are not limited to):

| | |
|---|---|
| −CN | as in cyanides; |
| −CR$_3$ | as in organolithium (or other alkali or alkaline earth metals) compounds; |
| HC—(R)—(CO$_2$R)$_2$ | as in malonates and di- or trisubstituted methane derivatives in general in which the substituents activate the substituents methane carbon for carbon-alkylation reactions under basic conditions. |

Examples of nitrogen-containing nucleophiles which result in the attachment of —N— linkage to the benzylic position include (but are not limited to):

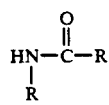 as in amides;

NH$_n$R$_{3-n}$   as in various amines (n = 0, 1, 2 or 3);

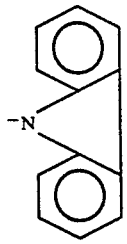 as in carbazoles;

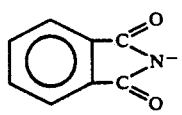 as in phthalimides;

 as in pyridine;

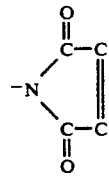 as in maleimide;

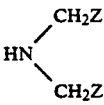 where Z is some functional group as in iminodiethanol, iminodiacetonitrile, di-acetonitrile iminodiacetic acid, etc.;

−N=C=O   as in cyanates.

Examples of phosphorus-containing nucleophiles which result in attachment of —P— linkage to the benzylic position (include but are not limited to):

| | |
|---|---|
| PH$_n$R$_{3-n}$ | as in various phosphines (n = 0,1,2 or 3). |

Examples of nucleophiles containing a metal (M) which result in the attachment of —M— linkage to the benzylic position include (but are not limited to):

| | |
|---|---|
| Mg— | (anthracene complex in THF); |
| Li— | (appropriately complexed). |

Examples in which Z is a small molecule of <1000 molecular weight containing other functionality in addition to the simple nucleophile which becomes attached at the benzylic position include (but are not limited to): triethanol amine, iminodiacetic acid, iminodiacetonitrile, iminodiethanol, vinyl pyridines, cinnamate, eleostearate, linoleate, acrylate, benzoyl benzoate, benzoyl phenolate, dihydroxybenzophenone, crown ether derivatives, cryptand derivatives, cellulose derivatives, sugar derivatives, low molecular weight polyethylene oxide or polypropylene oxide chains with terminal nucleophilic groups, etc.

It should be noted that these reactions, in which Y and/or Z contain other functionalities in addition to the simple nucleophile which becomes attached at the benzylic position, greatly extend the type and range of functionalities which can be incorporated into the grafted/functionalized copolymers of the present adhesives.

However, it should also be noted that attachment of Y and/or Z groups containing other functionalities requires even greater care during the nucleophilic displacement reaction by means of which the Y and/or Z groups are attached to insure that the new functionalities are preserved and are not consumed by sequential reactions to produce unintended crosslinking or gelation. In some instances, it may be desirable to block the functionalities that need to be preserved until the nucleophilic substitution reaction is completed.

Most nucleophilic substitution reactions of this type also involve some degree of side reactions which can be extremely detrimental, since even minor amounts of side reactions in high polymers can lead to unintended gelation which can greatly diminish utility. It is known that nucleophilic substitution reactions can proceed by several different mechanisms, and with most electrophiles, these different mechanisms can lead to different products or to different amounts of side reactions. Those reactions which proceed by a concerted $S_N2$ mechanism usually yield more of the desired substitution product than those proceeding by an $S_N1$ mechanism. In the present invention, elimination reactions are entirely prevented so that even nucleophilic substitution reactions proceeding by an $S_N1$ mechanism still lead selectively to the desired substitution product without undesired side reactions.

The "key" requirements for producing copolymers having molecular entanglement-inhibited architecture via selective nucleophilic substitution reactions are:

(1) Use of the isobutylene/para-halomethylstyrene/-para-methylstyrene base terpolymers for nucleophilic substitutions under appropriate, controlled conditions. The composition of the terpolymer can be varied as desired to yield the desired combination of properties (i.e. $T_g$, hardness, flexibility, impact strength, functionality level, etc.).

(2) Choosing the nucleophile and reaction medium so as to achieve the required intimate contact between the benzylic halogen attached to the base terpolymer and the nucleophile. It should be recognized that in some instances this can be accomplished by using a different solvent or reaction medium for the polymer and for the nucleophile and then employing an appropriate phase transfer catalyst to promote the reaction.

(3) Achieving specific solvation at the reaction site so that the desired nucleophilic substitution reaction is facilitated at mild conditions.

(4) Avoiding vigorous or harsh reactants or reaction conditions such as strong "hard" bases or high temperatures that would cause a loss in reaction specificity and allow side reactions to become important and/or cause crosslinking or degradation reactions to occur.

(5) Choosing the nucleophilic reagent and promoters appropriately so that the desired substitution reaction occurs quickly under mild conditions and potential undesired side reactions are avoided. For example, in using a carboxylic nucleophile in an esterification reaction to replace the benzylic bromines on an isobutylene/para-methylstyrene/para-bromomethylstyrene base terpolymer, one could choose the potassium salt of the acid as the nucleophilic reagent, along with 18 Crown-6 to solvate the potassium ion and promote the desired esterification substitution reaction, or one could choose the tetrabutyl ammonium counterion in an appropriate solvent as a nice weak acid to promote the reaction, rather than trying to use a hard ionic salt of the carboxylic acid as the nucleophilic reagent.

(6) Choosing reaction conditions to minimize sequential reactions by recognizing that the nucleophilic substitution reaction being conducted can itself form attached pendant nucleophilic reagents on the base copolymer backbone and that these already attached nucleophilic reagents can nucleophilically "attack" other unreacted benzylic bromines on the base terpolymer in a sequential manner to consume the desired, already attached new functionality, and at the same time produce undesirable crosslinking and gelation.

Summarizing, reaction conditions must be chosen such that the unreacted nucleophilic reagent being used in the nucleophilic substitution reaction is either a much stronger, more reactive nucleophile, or is present in great excess over any attached nucleophilic functionality produced in the substitution reaction. For example, it must be recognized that attached basic groups will become available nucleophiles under basic conditions for further reaction with benzylic bromine. These intrapolymeric groups can react with other benzylic bromines to consume the already attached pendant functionality and produce undesired crosslinks. The result is gelled polymer instead of the desired pendant graft and/or functionalized copolymer component. Attempting to replace the remaining benzylic bromines of the base partially grafted terpolymer with mercaptan groups, it must be recognized that the attached SH (mercaptan) groups will form incorporated mercaptide nucleophilic reagents under basic conditions and these incorporated mercaptide groups will react with other residual benzylic bromines to consume the already incorporated pendant mercaptan functionality and produce undesired thioether crosslinks resulting in gelled polymer instead of the desired pendant grafted and/or functionalized copolymer component.

Likewise, in producing additional pendant hydroxy groups on a partially grafted copolymer component of this invention embodiment, it must be recognized that the attached hydroxy groups will form alkoxide nucleophilic reagents under strongly basic conditions, and these attached alkoxide groups can react in a sequential manner with other residual unreacted benzylic bromines of the base terpolymer to consume the already attached pendant hydroxy functionality to produce ether crosslinks, resulting in gelled polymer rather than the desired pendant grafted and/or functionalized polymer component.

The key requirement of recognizing the potential for sequential reactions and choosing conditions to minimize them is especially important in cases where it is desired to produce the grafted polymer components of this embodiment of the invention with mixed pendant functionality. In these mixed functionality polymers, it is extremely important to choose functionalities and conditions such that the desired pendant functionalities are preserved and sequential reactions are avoided.

The exact conditions suitable for preparing the various grafted/functionalized copolymer components will vary depending upon the macromonomer and/or new functionality being introduced, as well as the base copolymer composition and other factors, and some experimentation may be necessary to define practical conditions in each case, but the same key factors as outlined herein must always be considered and observed. This will become clearer in the specific examples to follow, but some general reaction conditions can first be defined.

The nucleophilic substitution reactions can be run in solution using a solvent system in which both the base polymer and nucleophilic reagent (macromonomer) are soluble; can be run in a two-phase liquid run system with the base polymer dissolved in one phase and the nucleophilic macromonomer or other reagent in the other; can be run in a two-phase solid/liquid system (i.e. with the base polymer dispersed in a liquid phase containing the nucleophilic macromonomer or other reagent); or can be run in bulk with reactants dissolved or dispersed in the base polymer. The common solution situation is most controllable and generally the preferred case, but the bulk reaction may be economically advantageous in some cases where suitable reagents and reaction conditions can be found.

The intermediate two-phase systems may be advantageous under some circumstances and may be necessary in instances where the solubility parameters of the base polymer (containing the electrophile) and the nucleophilic macromonomer or other reagent are so different that no common solvents exist. In these two-phase cases, it is often or usually desirable to use phase transfer catalysts to promote the nucleophilic substitution reaction at the interface between the phases or to transport the nucleophilic macromonomer or other reagent to the electrophile site in the base polymer. A most preferred way of preparing the pendant grafted/functionalized polymers of this embodiment of the invention is to conduct the halogenation and the nucleophilic substitution in the same medium in sequential reactions (halogenate and then nucleophilically displace the halogen) without ever recovering the base halogenated polymer separately. As previously mentioned, the macromonomer can likewise be prepared using the same type of solvent, and the macromonomer grafting can be effected by admixing the respective solution intermediates, without the need of ever isolating the macromonomer or the base terpolymer to which the macromonomer is grafted.

Depending upon the reactivity of the nucleophilic macromonomer or other reagent used and the reaction conditions, the nucleophilic substitution reactions can be run at temperatures varying from about 0° C. to about 200° C. as limited by thermal stability of the nucleophilic macromonomer and/or reagent, the base polymer and the grafted/functionalized product polymer. Normally, temperatures between about 0° C. and about 150° C. are preferred. Reaction times are normally (but not necessarily) chosen to allow the nucleophilic displacement reaction to go to completion (i.e. exhaustion of either the electrophile or the nucleophilic reagent) and may range between several seconds and a few days. Normally, reaction times between a few minutes and several hours are preferred and reaction temperature and other conditions are set to make a convenient reaction time possible.

A wide range of solvents and/or solvent blends may be used as the medium in which the nucleophilic displacement reaction is run and it is this factor which determines whether a solution, dispersion, or bulk reaction is conducted. A number of factors are important in selection of the solvents. They need to be inert under the reaction conditions, easily removed from the product, easily recycled for reuse in the process, of low toxicity under use conditions with minimum environmental health concerns, and economical to use. In addition, the solvents need to provide a reaction environment which is favorable for the reaction being run, that is, they must bring the reactants into the required intimate solution contact and should provide solvation stabilization for intermediate states along the desired reaction route. It is frequently necessary or desirable to use a blend of solvents to best achieve the various compromises required, with one solvent being an easily-handled good solvent for the base polymer and the other being a good solvent for the nucleophilic macromonomer or other reagent and/or providing solvation stabilization for the reaction intermediates. It is most preferred that the chosen solvent system be one that is suitable for the three separate reaction processes including the radical halogenation reaction and the anionic polymerization of the macromonomer, so that a sequential reaction route is feasible without having to recover the halogenated base polymer or the nucleophilic terminated macromonomer.

Solvents which are particularly suited for this sequential reaction route vary somewhat depending upon composition of the base polymer and macromonomers. With the elastomeric base polymers high in isobutylene and with many glassy non-polar macromonomers, the low boiling saturated hydrocarbons ($C_4$–$C_7$) or halogenated hydrocarbons ($C_1$–$C_7$) are excellent. Often it is desirable to add a more polar co-solvent, such as a low boiling alcohol ($C_1$–$C_4$) during any optional nucleophilic displacement reaction in order to dissolve and carry-in any other simple nucleophilic reagent, as well as provide solvation stabilization for optional nucleophilic displacement reactions. Aromatic solvents such as benzene, toluene, and chlorobenzene are generally good solvents for the base polymer and nucleophilic macromonomer and provide a reaction medium favorable for many additional nucleophilic displacement reactions, but often present other problems (i.e. the toxicity of benzene or the high reactivity of toluene during radical halogenation which makes it unsuitable as the reaction medium during the halogenation stage of the sequential reaction route). Preferred solvent composition changes as composition of the base polymer is changed and depends upon whether it is desired to run the reactions in solution or dispersion.

Similar considerations apply when considering the nucleophilic displacement reaction(s) separately. In order to run this reaction(s) in solution, a good solvent for the base polymer and nucleophilic macromonomer (depending upon its composition) is required and a co-solvent for the other simple nucleophilic reagent(s) may also be desirable or required. Good solvents for the base polymer and nucleophilic macromonomers are similar to those cited above as being suitable for the sequential reaction route, but a broader range of solvents can be considered since inertness during radical halogenation is not required. The low boiling saturated hydrocarbons ($C_4$–$C_7$) or halogenated hydrocarbons ($C_1$–$C_7$) and aromatic hydrocarbons or naphthenes are preferred. Where greater solvent polarity is desired, tetrahydrofuran can be employed or good solvating agents such as dimethyl formamide or dimethyl sulfide can be added. The latter solvents are also good solvents for many of the simple nucleophilic reagents and may be employed along with alcohols or ketones to dissolve the simple nucleophilic reagent for addition to the base polymer/macromonomer solution. This technique of adding a solution of the simple nucleophilic reagent (in a solvent miscible with that used for the base polymer/macromonomer) with rapid stirring of the base polymer solution often results in a fine dispersion of the nucleophilic reagent so that even in cases where the nucleophilic reagent is not completely soluble in the mixed solvent resulting after the addition, an essential solution nucleophilic displacement reaction can still be run because the simple nucleophilic reagent dissolves during reaction to replenish the nucleophilic solution concentration as the reaction progresses.

In more extreme cases, where the simple nucleophilic reagent is not soluble in co-solvents miscible with the base polymer/macromonomer solvent, or where the solubility of the simple nucleophilic reagent in mixed solvency (which will retain the base polymer/macromonomer in solution) is too low, then a two-phase reaction may be run with the base polymer/macromonomer dissolved in one phase and the nucleophilic reagent in the other. In such cases, good mixing is essential to provide lots of interfacial contact between the reactants, and a phase transfer catalyst is generally desirable to aid in transporting the nucleophilic reagent to the residual ungrafted benzylic halogen electrophile site(s) on the base polymer. An example might be highly polar water soluble nucleophilic reagents such as potassium cyanide, sodium sulfite, or nitrilotriacetic acid. Examples of phase transfer catalysts useful in these two-phase reactors include (but are not limited to): tetrabutyl ammonium bromide, tetrabutyl ammonium bisulfate, tetrabutyl ammonium hydroxide, benzyl triethyl ammonium chloride, tetrabutyl phosphonium bromide, crown ethers, cyptands, Adogen 464, etc. These same types of materials are sometimes beneficial in speeding up the one-phase solution reaction by providing specific solvation at the reaction site.

The most convenient reaction condition is running a bulk reaction with the macromonomer and/or additional simple nucleophilic reagent dissolved or dispersed in the base polymer. Working with high solids eliminates the costs of solvent handling and recycle. However, the bulk reaction requires use of an expensive inefficient reactor such as an extruder which is capable of providing mixing in highly viscous systems and restricts the reaction medium so that only selected nucleophilic displacement reactions are possible, and even those are more prone to involve side reactions because of the more restrictive conditions and poorer mixing which prevails during reaction.

In addition to the general reaction considerations already discussed, the factors known to influence nucleophilic substitution reactions (by those skilled in the art) may be applied in making the pendant grafted/functionalized polymer components of this embodiment of the invention without materially affecting the invention. Thus, reaction routes and activation energy can be controlled by specific solvation, or catalysts, undesired reactions can be prevented by blocking, etc.

III. ENTANGLEMENT INHIBITED OLEFINIC MACROMOLECULES

A. Olefin Polymer Main Chain with Polymeric and/or Oligomer Side Chains

In an alternate embodiment of the present invention, the entanglement-inhibited architecture is provided as an olefin polymer main chain including a main chain of one or more simple α-olefin monomer repeat units and a plurality of polymeric or oligomeric, side chains distributed along the main chain. Aspects of main chain/-side chain molecular architecture have been previously described.

In this embodiment, the α-olefin is preferably ethylene, propylene or a combination thereof. However, any monomer having α,β-ethylenic unsaturation capable of vinyl polymerization by any of the standard techniques including, cationic, Ziegler, anionic, coordination, radical polymerization, and the like may make up the olefinic main chain backbone polymer with side polymeric or oligomeric chains attached to the backbone. Examples of such olefin monomers include monoolefinically unsaturated monocarboxylic acids such as acrylic acid, methacrylic acid, and the like; hydrocarbyl esters of monoolefinically unsaturated monocarboxylic acids including methyl acrylate, methyl methacrylate, t-butyl acrylate, ethyl acrylate, lauryl methacrylate, 2-ethylhexyl methacrylate and the like; monoolefinically unsaturated dicarboxylic acids or anhydrides including maleic acid, maleic anhydride, citraconic acid, itaconic acid, and the like; vinyl esters of saturated carboxylic acids such as vinyl acetate, and the like; vinyl halides including vinyl chloride, vinylidene chloride, and the like; vinyl aromatics such as styrene, α-vinyl toluene, α-vinyl naphthalene, divinyl benzene, and the like; acrylonitrile, and the like; carbon monoxide, sulfur dioxide, and the like. The main chain or backbone of such olefinic polymer may include one or more simple monomers copolymerizable together randomly or in blocks, and in a preferred embodiment include norbornene terminated macromonomer side chains.

In one aspect, the olefin polymer in this embodiment of the present invention comprises a copolymerized product of one or more simple α-olefin monomers with a monoolefinically terminated macromonomer. The side chains comprise macromonomer repeat units and are distributed in the polymer main chain.

In another aspect, the olefin polymer in this embodiment is a post-polymerized product wherein the main chain comprises repeat units of simple α-olefin monomers having pendant functionality and the side chains comprise a macromonomer or oligomer repeat unit grafted to the main chain wherein the macromonomers and oligomers have terminal functionality appropriate for the post-polymerized grafting reaction. For example, in a main chain polymer comprising pendant carboxylic acid functionality such as an ethylene-acrylic acid copolymer, the carboxylic acid groups undergo a transesterification reaction with a macromonomer and-/or oligomer having terminal hydroxy functionality to incorporate the polymeric and/or oligomeric kernel as a pendant ester side chain. Similarly, a main chain polymer such as ethylene-methyl methacrylate with methyl ester functionality will undergo transesterification with the hydroxy terminated macromonomer and/or oligomer. Alternately, a nucleophilic substitution reaction may be utilized to graft the pendant side chains. Appropriate electrophile leaving groups such as halogens may be copolymerized into the main chain as a halide containing comonomer, or the polymer main chain may be functionalized in a post polymerization reaction, e.g. halogenation. Then the halide functionality containing main chain polymer can be reacted with a nucleophilic terminated macromonomer (oligomer) in a nucleophilic substitution reaction. Aspects of nucleophilic substitution reactions and nucleophilic terminated macromonomers have been mentioned previously. Functionalization of polymers such as by halogenation and transesterification reactions are known in the art.

B. Preparation of Norbornene Terminated Macromonomers

Norbornene terminated macromonomers having the desired molecular weight structure and compositional homogeneity are preferably prepared according to anionic polymerization techniques under conditions in which spontaneous termination or chain transfer does not occur. Since these anionic polymerizations lack termination or chain transfer reactions, the stable carbanion chain growth centers can be selectively tailored by molecular weight and functional end group. Functionalization of these polymeric monomers may follow either of two routes:

(i) initiation with an organolithium derivative containing a protected functional group; or (ii) controlled termination with one or more reagents to yield the desired functionality. Norbornene functionality cannot be ordinarily introduced with certainty as a termination step, so a post-termination nucleophilic reaction may be utilized. In this method, the nucleophilic termination step functionality is reacted with a norbornene containing electrophilic reagent.

Alternatively, norbornene functionality may be introduced into a polymeric monomer at the chain initiation step by an appropriate norbornene functionality containing organolithium initiator. Whether norbornene functionality is introduced by either of these two methods, the resulting polymer is most useful if narrow molecular weight dispersity is preserved and the product is essentially completely norbornene terminated. Several problems are known in both of these methods. Initiation rates of organolithium initiators containing norbornene functionality ordinarily are too slow to maintain monodispersity, and the introduction of norbornene functionality by a post termination nucleophilic reaction may not yield a polymeric monomer with the requisite yield of norbornene functionality. Lastly, the incorporated vinyl functionality in the macromonomer must be sufficiently active compared to simple olefin monomers in the copolymerization reactions to obtain random distribution of copolymerized side chains.

A lithium norbornene anionic polymerization initiator has been found to meet these criteria. Specifically, 2-lithiomethyl-5-norbornene is a primary alkyl organolithium catalyst which initiates rapidly compared to chain propagation to give norbornene terminated polymers having narrow molecular weight distributions. Such macromonomers are essentially completely norbornene terminated. Norbornenes are known to be active monomers with reaction reactivities similar to the reactivity of α-olefins such as ethylene and propylene in various polymerization systems, including coordination and Ziegler, catalyst, radical and olefin metathesis polymerizations.

As with all anionic polymerizations, preparation of lithionorbornene catalysts, of which 2-lithiomethyl-5-norbornene is especially preferred, proceeds under rigorous exclusion of water and oxygen. Reactants and solvents of top purity are utilized to exclude impurities capable of inhibiting reaction yield such as water, oxygen, and other nucleophilic substances. Equipment is carefully dried and reaction is carried out in a dry box under inert atmosphere.

Synthesis of the preferred 2-lithiomethyl-5-norbornene anionic initiator is a two reaction step procedure. Initially, a 2-bromomethyl-5-norbornene precursor is prepared by the Diels-Alder reaction of dicyclopentadiene and allyl bromide. Then, a solution of 2-bromomethyl-5-norbornene is lithiated with metallic lithium to produce the desired initiator.

Macromonomers terminated with norbornene functionality may be prepared from monomers capable of anionic polymerization utilizing a lithium norbornene initiator. Among such monomers are vinyl aromatic compounds such as styrene, α-vinylstyrene, p-methylstyrene, α-methylstyrene, α-vinylnaphthene, and the like; alkyl-diene compounds including 1,3-butadiene, isoprene, 1,3-pentadiene, cyclohexadiene, and the like; acylic and methacrylic esters including alkyl and branched alkyl esters; acrylonitrile, and vinyldiene chloride. Such polymerized macromolecules may be homopolymers or random or block multipolymers having two or more comonomers. Norbornene terminated macromolecules are preferably linear chains, but they may be star configured or any other block configuration utilizing a block linking compound of which dichlorodimethylsilane, trichloromethylsilane and tetrachlorosilane are representative examples. Reaction conditions required for anionic polymerizations have been previously described hereinabove.

These embodiments of the invention can be more fully understood with reference to the specific examples providing details on the introduction of entanglement-inhibiting side chains to macromomolecule polymer systems including olefinic and isobutylene/para-methylstyrene/para-bromomethylstyrene based polymers.

EXAMPLE A

Preparation of Brominated Base Polymer

A sample of isobutylene/para-methylstyrene/para-bromomethylstyrene base terpolymer was prepared as follows:

A 500 ml reaction flask fitted with a thermometer, stirrer, and dropping funnel was set up in a glove box having an oxygen- and moisture-free nitrogen atmosphere, and the flask was cooled to $-98°$ C. by immersion in a controlled temperature liquid nitrogen cooled heat transfer bath. The reactor was charged with 386.6 g purified dry methyl chloride (having a purity of 99.8%), 47.4 g purified, dried and distilled polymerization grade isobutylene (having a purity of 99.9%), and 2.6 g purified, dried and vacuum-distilled para-methylstyrene (2.5 mole % of total monomers). Seventeen ml of a catalyst solution consisting of 0.19 weight percent ethyl aluminum dichloride (EADC) in methyl chloride was allowed to drip slowly into the feed blend from the dropping funnel over the course of 12 minutes while stirring and attempting to maintain temperature by immersion of the reactor in the heat transfer bath. Despite the efforts at cooling, reactor temperature rose from $-98°$ C. to $-80°$ C. due to the exothermic polymerization reaction, and a slurry of polymer in a slightly tannish-colored liquid was formed. Some of the polymer agglomerated on the stirrer and reactor walls. The reactor was quenched by adding 25 ml of cold methanol to yield an agglomerated mass of white polymer in a clear colorless liquid. The polymer was recovered by allowing the methyl chloride to flash off and kneading and washing the polymer in methanol; 0.2 weight percent butylated hydroxytoluene (BHT) was added as an antioxidant and the polymer was dried in a vacuum oven at 80° C. Fifty grams of dried white, opaque, tough, rubbery polymer were recovered. Conversion was 100% with a quantitative recovery of the polymer. Catalyst efficiency was about 1550 grams of polymer/gram of EADC. The recovered polymer had a viscosity average molecular weight ($M_v$) of 458,000, and contained 5.2 weight percent (2.5 mole percent) para-methylstyrene. Gel permeation chromatography (GPC) analysis using ultraviolet (UV) and refractive index (RI) detectors showed the para-methylstyrene to be uniformly distributed over the entire molecular weight range indicating that a compositionally homogeneous copolymer has been formed.

The GPC was performed using a Waters 150-C ALC/GPC (Millipore Corporation) with a Waters Lambda-Max Model 481 LC UV Spectrophotometer on line. Data were collected and analyzed using customized software developed with Computer Inquiry Systems, a division of Beckman Inc. Tetrahydrofuran was used as the mobile phase at various flow rates, but generally 1.0 ml/min. The instruments operated at 30° C. at a wavelength of about 254 nm for the UV. The polyisobutylene backbone has negligible absorbance compared to the aromatic ring at this wavelength. Columns used were Styragel (Waters) or Shodex (Showa Denko). Sets of columns of wide porosity range were calibrated with narrow molecular weight distribution polystyrene standards with molecular weights from $10^3$ to $4 \times 10^6$. Molecular weights are reported in terms of the polyisobutylene backbone using a universal calibration. The output from the UV and differential refractometer detectors can be compared quantitatively to calculate deviations in composition from the mean. Generally, viscosity average molecular weights are based on separate measurements in diisobutene at 20° C.

The high molecular weight random uniform copolymer of para-methylstyrene and isobutylene prepared as above was dissolved in dried normal hexane in a two-liter baffled and jacketed resin flask set up for bromination with a four-neck resin flask top. An air-driven turbine mixer was used to provide efficient mixing, and a thermometer and thermocouple were used to measure and control the temperature, which was adjusted as noted hereinbelow by circulating a controlled temperature heat transfer fluid through the jacket. One of the necks was used for mounting a dropping funnel containing the bromine solution, which was added dropwise into the reactor. The funnel and reactor were foil-wrapped to exclude light. A nitrogen bubbler tube with a sintered glass frit at the end was mounted in one of the necks, with the frit immersed in the reactor solution to provide nitrogen sparging at a rate which was set and controlled by a rotometer. The fourth neck was connected by plastic tubing to a knock-out trap and caustic scrubber in order to maintain several inches of water positive pressure during reaction, and to absorb and neutralize any HBr and bromine vapors given off during the reaction.

The bromine solution was prepared by adding a weighed amount of bromine to pure mole-sieve dried n-hexane (essentially olefin-free) in the dropping funnel, and mixing to form less than a 30% solution. The foil-wrapped (to protect from the light) bromine dropping funnel was then mounted on the stirred, temperature-controlled, nitrogen-purged reactor, and a 500 watt tungsten light bulb was mounted immediately next to the reactor. The reactor was heated to 40° C. and the bromine solution added dropwise. The bromine charge was 5 percent by weight of the copolymer, and the reaction occurred rapidly as the bromine was added, as evidenced by rapid HBr evolution and rapid fading of the color of the solution. Bromine was added over the course of two minutes, and the reaction was quenched with excess caustic ten minutes after bromine addition had been initiated. The quenched solution then was washed with water, and the brominated copolymer was recovered by alcohol precipitation and vacuum oven drying as previously described. BHT and tetramethylthiuram disulfide were mixed into the copolymer at 0.1% by weight as stabilizers prior to drying. The recovered brominated copolymer was soluble in diisobutylene, had an $M_v$ of 254,000, and included 1.26 wt. % bromine as measured by Dietert analysis. Analysis using 400 MHz NMR showed the presence of 0.9 mole % benzylic bromide group, with no other brominated structures detectable. GPC analysis using UV and RI detectors showed the brominated copolymer to be a uniform, homogeneous compositional distribution, narrow molecular weight distribution ($M_w/M_n \approx 2$) functional copolymer.

EXAMPLE B

Preparation of Nucleophilically Terminated Polystyrene Macromonomers

In the following examples, macromonomers of nucleophilically terminated polystyrene were prepared for subsequent nucleophilic reaction with the isobutylene/para-methylstyrene/para-bromomethylstyrene copolymers (BrXP-50).

EXAMPLE B(1)

In this example, water and air were strictly excluded from the anionic polymerization, equipment was very clean and high purity starting materials were utilized. A monofunctional polymeric meucleophile based upon polystyrene was prepared by neutralization of carbon dioxide terminated polystyryllithium of polystyrene carboxylic acid. The apparatus was oven dried, placed into a vacuum chamber to cool and stored in a dry box prior to use. The polystyrene carboxylic acid was prepared by "living" anionic polymerization of styrene (degassed 10 wt. % solution) in tetrahydrofuran (THF) or cyclohexane at 40° C. with sec-butyllithium initiator. The polymerization was terminated at $-78$° C. by addition of the "living" polymer solution to the saturated solution of carbon dioxide in THF. The polymer was precipitated in isopropanol containing 1 ml HCl and 0.2 wt. % BHT (0.2 wt. %). The polymer was dried for 24 hrs at 45° C. in vacuum. The molecular weight of the polystyrene carboxylic acid was readily varied by altering the monomer to initiator ratios and typical molecular weights were 10,000 and 25,000. The polystyrene carboxylic acid was neutralized in THF solution with either the potassium or tetrabutylammonium salt of BHT (prepared by reacting an excess of BHT with potassium tert-butoxide or tetrabutylammonium hydroxide), and the polystyrene carboxylate was precipitated in isopropanol/BHT. The polymeric salt was dried for 24 hrs in vacuum.

EXAMPLE B(2)

Polystyrene corboxylic acid macromonomer was prepared by carbonation of poly(styryl)lithium in cyclohexane using 1,1-diphenylethylene, tetrahydrofuran and carbon dioxide. A 3 liter round bottom flask was fitted with a reflux-takeoff head and an adapter containing a stopcock and serum stopper. The flask was charged with 2.75 l of cyclohexane. The cyclohexane was distilled until 2 liters remained. After cooling to 40° C., 200 g (300 ml) styrene was added. The flask was placed in a hexane bath to control temperature. Polymerization was initiated by addition of 25 ml sec-butyllithium (1M, in hexane) and the temperature of the bath rose to 50° C. and viscosity increased rapidly. After 4 hrs, a solution of 1,1-diphenylethylene in THF was added (50 ml of 0.05 g/ml solution). A bright orange-red color immediately appeared. The flask was then cooled to $-10$° C. and reagent grade carbon dioxide was bubbled into the flask. The color was discharged instantaneously with mixing. The resulting polymer was neutralized with dilute HCl (3 ml of conc. HCl, 7 ml of water, and 50 ml of THF) and precipitated in isopropanol.

EXAMPLE B(3)

Polystyrene carboxylic acid was prepared in this example by carbonation of poly(styryl)lithium in cyclohexane using N,N,N',N'-tetramethylethylenediamine and carbon dioxide. A three liter round bottom flask was fitted with a reflux-takeoff head and an adapter containing a stopcock and serum stopper. The flask was charged with 2.75 liters of cyclohexane. The cyclohexane was distilled until 2 liters remained, then the flask was allowed to cool to 40° C. before styrene (104 grams, 100 ml) was added. The flask was placed in a hexane bath to aid in the regulation of the temperature. Polymerization was initiated by addition of 18.9 ml s-butyllithium (1M in hexane). The temperature of the bath rose to 50° C. and viscosity increased rapidly. After four hours, a solution of the N,N,N',N'-tetramethylethylenediamine in cyclohexane was added (25 ml of 0.25 g/ml solution). The flask was then cooled to −10° C. and reagent grade carbon dioxide was bubbled into the flask. Color discharged instantaneously with mixing.

EXAMPLES 1-5 AND COMPARATIVE EXAMPLES 1-3

In the following examples and comparative examples, several different simple olefin polymers were grafted with entanglement inhibiting side chains and were compared to ungrafted samples for melt viscosity under varying shear rates. The polymers utilized included copolymers of ethylene and/or propylene with acrylic acid (EAA or P-E-AA) and the grafting reaction was transesterification with pendent carboxylic acid functionality. In a transesterification reaction, either stearyl segments or butyl segments were grafted onto the polymer backbone utilizing terminal hydroxy functionality.

The acrylic acid copolymers utilized were commercially obtained and the transesterification reactions were performed by procedures well known in the art. Polymer composition and entanglement inhibiting molecular structure parameters are shown in Table II. Table III shows the viscosity and MI values of the polymer before and after grafting reactions. Comparative Example 1 is the precursor polymer for Examples 1 and 4. Comparative Example 2 is the precursor polymer for Examples 2 and 5. Comparative Example 3 is the precursor polymer for Example 3. These results indicate that following modification of the subject polymers with entanglement inhibiting side chains, both melt viscosity or MI exhibited reduced (or increased) values at all shear rates tested and the amount of reduction was dependent upon the side chain length.

TABLE II

| | EXAMPLE | | | | |
|---|---|---|---|---|---|
| | 1 | 2 | 3 | 4 | 5 |
| COMPOSITION (WT %) | MAIN CHAIN "A" | | | | |
| Ethylene | 80 | 90.5 | 19 | 80 | 90.5 |
| Propylene | — | — | 75 | — | — |
| Acrylic acid | 20 | 9.5 | 6 | 20 | 9.5 |
| PERCENT GRAFTED | SIDE CHAIN "B" | | | | |
| Stearic acid | 80 | 100 | 100 | — | — |
| Butanoic acid | — | — | — | 80 | 100 |
| PHYSICAL PROPERTIES | | | | | |
| MI | $229^b$ | $8.8^b$ | $13.6^a$ | $229^b$ | $8.8^b$ |

$^a$230° C./2.16 kg
$^b$190° C./2.16 kg

TABLE III

| | VISCOSITY at 180° C. (poise) FREQUENCY (rad/sec) | | | | |
|---|---|---|---|---|---|
| EXAMPLE | 0.1 | 1 | 10 | 100 | MI |
| 1 | 200 | 58 | 42.3 | 41.6 | $>600^b$ |

TABLE III-continued

| | VISCOSITY at 180° C. (poise) FREQUENCY (rad/sec) | | | | |
|---|---|---|---|---|---|
| EXAMPLE | 0.1 | 1 | 10 | 100 | MI |
| Comp. 1 | 2,423 | 950 | 696 | 549 | $229^b$ |
| 2 | 12,220 | 4,045 | 2,662 | 772 | $53.5^b$ |
| Comp. 2 | 29,950 | 19,710 | 9,141 | 1,402 | $8.8^b$ |
| 3 | 36,220 | 7,784 | 2,801 | 542 | $95.4^a$ |
| Comp. 3 | 56,200 | 13,900 | 5,481 | 1,589 | $13.6^a$ |
| 4 | 781 | 136 | 113 | 110 | $452^b$ |
| 5 | 16,040 | 9,077 | 5,078 | 2,057 | $36.7^b$ |

$^a$230° C./2.16 kg
$^b$190° C./2.16 kg

Every grafted polymer had reduced melt viscosity compared to the non-grafted polymer. The relatively modest melt viscosity reduction in Examples 4–5 having short side chain grafts compared to Examples 1–3 having longer side chain grafts strongly implies that viscosity reduction seen in Examples 1–3 is the result of grafts inhibiting chain entanglement in the melt rather than reduced polar-polar interactions and hydrogen bonding between chains.

EXAMPLE 6

Preparation of Norbornene Terminated Polystyrene Macromonomers

In a 1 liter steel reaction vessel fitted with a 2000 kpa pressure release valve and a steel plug, a Diels-Alder reaction was conducted to prepare a bromonated norbornene reactant, specifically 2-bromomethyl-5-norbornene. In the reaction vessel was placed 264.4 g (4 mols) of dicyclopentadiene from Aldrich, 532.4 g (4.4 mols) of allylbromide also from Aldrich sold under the gold label, 3.9 g of hexadecane (the GC internal standard) and 0.5 g BHT. The allylbromide was purified initially by passing it through a column containing sodium bicarbonates followed by magnesium sulfate. The reaction mixture was allowed to react for 6 hours at 180° C. and the resulting mixture contained about 75 weight percent 2-bromomethyl-5-norbornene, 9 weight percent dicyclopentadiene, 3 weight percent allylbromide and unidentified isomers of each. Analysis was conducted by GLC.

The above reaction was repeated except that 580.8 g (4.8 mols) of allylbromide was utilized. The resulting reaction mixture contained 78 weight percent 2-bromomethyl-5-norbornene, 2 weight percent dicyclopentadiene, 7 weight percent allylbromide, and unidentified isomers. Next, the reaction mixtures from above were combined and purified by distillation. The first distillation was conducted in a 3 liter, 3 neck flask fitted with a nitrogen purge, a thermocouple and an efficient column. The system pressure was maintained a 700 mm hg pressure and the pot temperature was slowly raised to 175° C. At these conditions, the dicyclopentadiene decomposed and cyclopentadiene, and allylbromide was distilled. When no additional volatile products were produced, the pressure was dropped and the contents of the flask were flashed into a receiver vessel. This distillate contained 2 weight percent dicyclopentadiene, 95 weight percent 2-bromomethyl-5-norbornene and higher boiling isomers not identified. This mixture was then fractionally distilled at 13 mm hg to produce several fractions ranging from 96 to 99.8 weight percent of the product. The overall purified yield was 60 percent.

In the reaction steps that followed to produce the norbornene terminated polystyrene macromonomers, all reactions and reagents were handled under nitrogen with great care taken to prevent contamination by oxygen and water. The monomers were purified by distillation from dibutylmagnesium within 24 hours of polymerization. The solvents (heptane, cyclohexane, ether or tetrahydrofuran) were purified prior to polymerization by vacuum distillation from butyllithium. All glassware and equipment were oven dried at 150° C. for 3 hours then cooled and assembled under inert atmosphere in a dry box. The monomer was added to the solvent just prior to use.

The 2-bromomethyl-5-norbornene prepared above was lithiated in a 2 liter 2 neck flask, fitted with a stirrer and septum inlet and assembled in a dry box. Into the reaction vessel was placed 700 ml ether previously distilled from dibutylmagnesium and 4 g lithium (from Lithco having 0.8 percent by weight sodium). The flask was closed and 38 g of a 5 weight percent solution of 2-bromomethyl-5-norbornene was added dropwise over a period of 6 hours. As the reaction began, the reaction flask was cooled to −50° C. At the end of the reaction period, an aliquot was removed and analyzed by GLC. The bromide reactant was quantatively converted to 2-lithiomethyl-5-norbornene at about a 90 percent conversion factor. Excess lithium was removed by passing the reaction effluent through a frit and the ether solvent was rotary evaporated under vacuum at −50° C. The 2-lithiomethyl-5-norbornene reaction product was redissolved in cyclohexane to produce approximately 1 mole solution of the organolithium reactant.

Styrene was polymerized in an anionic polymerization process using the 2-lithiomethyl-5-norbornene prepared as catalysts. In a 3 liter flask fitted with a magnetic stirring bar, 2800 ml cyclohexane was added. The flask was heated to distill 600 ml cyclohexane and then was cooled. To the solvent 250 g freshly distilled styrene monomer (from dibutylmagnesium) was added together with 80 ml of the 2-lithiomethyl-5-norbornene solution. The polymerization began immediately and the flask temperature increased from 35° C. to 55° C. The reaction was held at 55° C. for 3 hours then the polymerization was terminated by methanol. The resulting polymer was precipitated in isoproponal and 0.1 BHT was added as stabilizer. Analysis showed that the resulting norbornene terminated polystyrene had a $M_w$ of 6600, a $M_n$ of 5700 and $M_w/M_n = 1.1$. Approximately 240 g of the polystyrene product was recovered.

EXAMPLE 7

An additional quantity of styrene was polymerized as in the Example 6 above except that 90 g of styrene was reacted with 3 ml of 2-lithiomethyl-5-norbornene. The reaction temperature was 35°-55° C. and the reaction was conducted for 3 hours. The resulting polymer product has a $M_w = 73,000$ and $M_n = 69,000$ and $M_w/M_n = 1.06$. The polystyrene yield was approximately 95 percent.

EXAMPLES 8-11 AND COMPARATIVE EXAMPLE 4

In the following examples, norbornene terminated macromonomers comprising 2-polystyryl-5-norbornene were copolymerized with ethylene and propylene to prepare an ethylene-propylene copolymer main chain with polystyryl side chains incorporated along the main chain backbone. The Ziegler polymerization was undertaken with a one liter reactor in a lab scale continuous polymerization process. Reactor temperature was 30° C., reaction pressure was 500 kpa, agitation speed was 1200 rpm and residence time in the reactor was 9 minutes. The reaction solvent was toluene fed at a rate of 4.11 g/hr, ethylene was fed at a rate of 95 g/hr and the propylene feed was 138 g/hr. The catalyst was $VCl_4$ at a rate of 0.493 g/hr and ethylaluminumsesquichloride fed at a rate of 3.162 g/hr. The feed rate of 2-polystyryl-5-norbornene macromonomer was 5.63 g/hr in Example 8, 11.26 g/hr in Example 9, 11.26 g/hr in Example 10, and 16.89 g/hr in Example 11. In Comparative Example 4, the ethylene-propylene polymer was prepared without copolymerized side chains. Conversion rate was about 85 percent for all polymerizations at a polymerization rate of ranging from 202 to 210 g/hr. Results and selected polymer properties are shown in Table IV.

TABLE IV

|  | EXAMPLE | | | | COMPARATIVE EXAMPLE |
|---|---|---|---|---|---|
|  | 8 | 9 | 10 | 11 | 4 |
| COMPOSITION (WT %) | MAIN CHAIN "A" | | | | |
| Ethylene | 49 | 45 | 42 | 40 | 48 |
| Propylene | 43 | 44 | 43 | 41 | 52 |
| MOLECULAR WEIGHT | | | | | |
| $M_n (10^3)$ | 112 | 111 | 106 | 106 | 107 |
| $M_w (10^3)$ | 184 | 182 | 172 | 171 | 174 |
| $M_{MCS} (10^3)$ | 62 | 56 | 42 | 35 | |
| $M_{MCS}/M_e^A$ | 37.3 | 33.7 | 25.3 | 21.1 | |
| COMPOSITION (WT %) | SIDE CHAIN "B" | | | | |
| Styrene | 8 | 11 | 15 | 19 | 0 |
| MOLECULAR STRUCTURE | | | | | |
| No. Grafts | 0.8 | 1.0 | 1.5 | 2.0 | |
| $M_n (10^3)$ | 5 | 5 | 5 | 5 | |
| $M_n/M_e^B$ | 0.28 | 0.28 | 0.28 | 0.28 | |
| PHYSICAL PROPERTIES | | | | | |
| Tensile Strength (psi) | 70 | 290 | 640 | 850 | 10 |
| Percent Elongation | 560 | 720 | 820 | 870 | 400 |

The distribution of polystyrene grafts in the polymer was determined by analyzing an aliquot from the reactor by gel permeation chromatography. The eluent of the chromatographic column was analyzed sequentially first by a differential refractometer which revealed the presence of polymer and a UV detector operating at 254 nm which revealed the presence of styrenic residue. The responses of these analyzers indicated that styrenic residues were incorporated in the polymer. The entanglement inhibiting structural parameters of the polymers are shown in Table IV. No entanglement inhibiting properties are expected for the grafted copolymers because each of them has $M_{MCS}$ value much higher than the $M_e^A$ value of its non-grafted counterpart (FIG. 2)

The side chain copolymerized polymers were tough transparent thermoplastic elastomers. The polymers were examined by transmission electron microscopy revealing multiphase morphology having spherical polystyrene domains interspersed and separated by an average of 30 nm. The viscosity was relatively constant between a temperature range of 100°-200° C. indicating continuation of 2-phase morphology in the melt. Under shear the polymer exhibited non-Newtonian behavior with the melt viscosity falling three orders of magnitude as the shear increased from $10^{-2}$ to $10^2$ rad/sec. The mechanical properties of the grafted copolymers increased with increasing polystyrene content. Ungrafted, the EP polymer had very little cohesive strength, however, the Example 11 polymer containing 19 percent grafted polystyrene had a tensile strength of about 900 psi with an elongation break at 870 percent.

EXAMPLES 12-15 AND COMPARATIVE EXAMPLES 5

In the following examples, base terpolymers of isobutylene/para-methylstyrene/para-bromomethylstyrene (BrXP-50) prepared similarly to Example A were grafted with polystyrene (PS) chains of varying length described in Example B to produce PS-grafted BrXP-50 (BrXP-50-g-PS). The composition of the XP-50 starting material of each of the five example BrXP-50-g-PS polymers was about 3 mole percent para-methylstyrene. The BrXP-50 obtained from brominating the XP-50 starting material contained about 1 mole percent para-bromomethylstyrene. Generally about half of the para-bromomethylstyrene was PS-grafted in the BrXP-50-g-PS so that the main chains in the example BrXP-50-g-PS polymers contained about 97 mole percent isobutylene, 2 mole percent para-methylstyrene, 0.5 mole percent para-bromomethylstyrene and about 0.5 mole percent PS-grafted-para-methylstyrene.

For the preparation of Example 12, THF 10 wt. % solutions of BrXP-50 prepared as in Example A and macromonomer potassium salt prepared in Example B(1) were mixed in a 250 ml flask equipped with stir bar, condenser and nitrogen purge. The flask was heated to reflux and aliquots were periodically taken to moniter the reaction progress. The reaction was complete after 48 hrs (as determined by GPC). The polymer was precipitated in isopropanol containing 0.5 ml HCl and 0.2 wt. % BHT. The polymer was dried for 24 hrs at 45° C. and 0.1 mm Hg pressure. Evidence of grafting included changes in the GPC integrated areas, morphology and solubility of th resulting polymer.

For the preparation of Example 13, a cyclohexane solution 7.5 g of poly(styryl)carboxylic acid from Example B(2) was treated with tetrabutylammonium hydroxide (10 ml, 1M in methanol) and BHT (2 g). This solution was added to a cyclohexane solution of the BrXP-50 polymer (22.5 g in 500 ml). The flask was heated to 70° C. and allowed to react for four hrs. The solution was then placed in a TEFLON tray and the solvent was removed in vacuum. FT-infrared analysis of thin films indicated that all the carboxylate groups present in the sample were converted into the ester form. GPC analysis (3 mg/ml THF solutions) of the graft copolymer conducted on a Waters 150 GPC at 0.5 cc/min indicated that less than 5% ungrafted polystyrene remained.

For the preparation of Examples 14-15, polystyrenelithium carboxylate (50 g) prepared as in Example B(3) was reacted with tetrabutylammonium fluoride (15 ml, 1M in THF). The resulting solution was added to a solution of BrXP-50 (150 g in 1.5 l cyclohexane). The mixture was then stirred and heated slowly to 70° C. and allowed to react for 2 hrs. The polymer was isolated by precipitation in isopropanol (0.1 g BHT). The resulting graft copolymer was transparent and tough. GPC indicated that more than 90% of the polystyrene was grafted.

TABLE V

|  | EXAMPLE | | | | COMPARATIVE EXAMPLE |
|---|---|---|---|---|---|
|  | 12 | 13 | 14 | 15 | 5 |
| COMPOSITION (Mole %) | MAIN CHAIN "A" | | | | |
| Isobutylene | 97 | 97 | 97 | 97 | 97 |
| p-Methylstyrene | 2 | 2 | 2 | 2 | 2 |
| p-Bromomethylstyrene | 0.5 | 0.5 | 0.5 | 0.5 | 1 |
| MOLECULAR WEIGHT | | | | | |
| $M_n$ ($10^3$) | 90 | 83 | 68 | 68 | 90 |
| COMPOSITION | SIDE CHAIN "B" | | | | |
| Styrene (WT. %) | 38 | 30 | 25 | 19 | — |
| MOLECULAR STRUCTURE | | | | | |
| No. Grafts | 1.5 | 3.6 | 7.6 | 4.0 | — |
| $M_n$ ($10^3$) | 25 | 10 | 3 | 4 | — |
| $M_{MSC}$ ($10^3$) | 36 | 18 | 7.9 | 14 | — |
| PHYSICAL PROPERTIES | | | | | |
| Viscosity at 180° C. (poise) Frequency (rad/sec) | | | | | |
| 0.1 | 1136 | 963 | 22 | 368 | 163 |
| 1 | 174 | 150 | 20 | 125 | 67 |
| 10 | 29 | 24 | 10 | 25 | 23 |
| 100 | 4.5 | 4.4 | 3.0 | 3.8 | 6.6 |

Results appearing in Table V indicate that the viscosity of the graft copolymers depended strongly on both the $M_n$ value of the side chain and the number of side chains grafted to the main chain. With a smaller number of polystyrene side chains of high $M_n$ (above 4000) such as Examples 12, 13 and 15, the graft copolymers were more viscous than their starting main chain polymers, Comparative Example 5. However, Example 14 contains entanglement-inhibiting side chains because its $M_{MSC}$ value is lower than the $M_e^A$ value of the main chain (Table I). Therefore, it exhibited a lower viscosity than a similar main chain (Comparative Example 5).

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

What is claimed is:

1. A polymer, comprising:
   macromolecules having an entanglement-inhibiting architecture including a main chain and a plurality of side chains distributed along said main chain;
   wherein an average molecular weight of segments of said main chain between adjacent side chains ($M_{MCS}$) is in a range of from about 0.02 $M_e^A$ to about 2 $M_e^A$, wherein $M_e^A$ is the entanglement molecular weight of said main chain; and
   wherein said side chains have an average molecular weight ($M_{SC}$) in a range of from about 0.02 $M_e^B$ to about 2 $M_e^B$, wherein $M_e^B$ is the entanglement molecular weight of said side chains.

2. The polymer of claim 1, wherein $M_{MCS}$ is above about 0.1 $M_e^A$.

3. The polymer of claim 1, wherein $M_{MCS}$ is above about 0.5 $M_e^A$.

4. The polymer of claim 1, wherein $M_{SC}$ is above about 0.1 $M_e^B$.

5. The polymer of claim 1, wherein $M_{SC}$ is above about 0.5 $M_e^B$.

6. The polymer of claim 1, wherein $M_e^A$ is at least about 1000.

7. The polymer of claim 1, wherein $M_e^B$ is at least about 1000.

8. The polymer of claim 1, wherein a weight average molecular weight of said main chain ($M_w^A$) is greater than about 3 $M_e^A$.

9. The polymer of claim 8, wherein $M_w^A$ is greater than about 5 $M_e^A$.

10. The polymer of claim 8, wherein $M_w^A$ is greater than about 10 $M_e^A$.

11. The polymer of claim 8, wherein a ratio of $M_w^A/M_n^A$, wherein $M_n^A$ is the number average molecular weight of said main chain, is less than 6.

12. The polymer of claim 11, wherein said ratio $M_w^A/M_n^A$ is less than about 4.

13. The polymer of claim 11, wherein said ratio $M_w^A/M_n^A$ is less than about 2.5.

14. The polymer of claim 11, wherein said ratio $M_w^A/M_n^A$ is less than about 2.

15. The polymer of claim 1, wherein a ratio of weight average molecular weight ($M_{SC}$) to number average molecular weight ($M_n^B$) of said side chains is less than about 6.

16. The polymer of claim 15, wherein said ratio of $M_{SC}/M_n^B$ is less than about 2.

17. The polymer of claim 15, wherein said ratio of $M_{SC}/M_n^B$ is less than about 1.5.

18. The polymer of claim 15, wherein said ratio of $M_{SC}/M_n^B$ is less than about 1.1.

19. The polymer of claim 15, wherein said ratio of $M_{SC}/M_n^B$ is from about 1.0 to about 1.05.

20. The polymer of claim 1, comprising an average of from about 2 to about 200 side chains per main chain.

21. The polymer of claim 1, comprising an average of from about 3 to about 100 side chains per main chain.

22. The polymer of claim 1, comprising an average of from about 4 to about 80 side chains per main chain.

23. The polymer of claim 8, wherein said weight average molecular weight of said main chain is in a range of from about 25,000 to about 500,000.

24. The polymer of claim 8, wherein said weight average molecular weight of said main chain is in a range of from about 50,000 to about 250,000.

25. The polymer of claim 1, wherein a weight average molecular weight of said main chain is in a range of from about 300 to about 25,000.

26. The polymer of claim 25, wherein said weight average molecular weight of said main chain is in a range of from about 1000 to about 15,000.

27. The polymer of claim 1, wherein a weight average molecular weight of said side chain is in a range of from about 50 to about 25,000.

28. The polymer of claim 27, wherein said weight average molecular weight of said side chain is in a range of from about 200 to about 20,000.

29. A graft polymer, comprising:
a main chain comprising a polymer of an isoolefin having 4 to 7 carbon atoms and a para-alkylstyrene, said main chain polymer having a substantially homogeneous compositional distribution, and a plurality of side chains distributed along said main chain and attached to para-alkyl groups of the main chain para-alkylstyrenes, the average molecular weight of segments of said main chain between adjacent side chains ($M_{MCS}$) is in the range of from about 0.02 $M_e^A$ to about 2 $M_e^A$, wherein $M_e^A$ is the entanglement molecular weight of said main chain, and the average molecular weight ($M_{SC}$) of the side chains is in a range of from about 0.02 $M_e^B$ to about 2 $M_e^B$, wherein $M_e^B$ is the entanglement molecular weight of said side chains, said side chains comprising polymers selected from the group consisting of polystyrene, polyisoprene, polypropylene and poly(phenylene oxide).

30. The graft polymer of claim 29, wherein the para-alkylstyrene is included as:

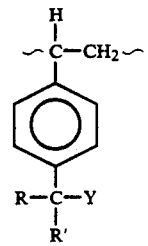

wherein R and R' are independently selected from the group consisting of hydrogen, alkyl and primary and secondary alkyl halides, and Y is a grafted macromonomer attached by nucleophilic substitution.

31. The graft copolymer of claim 30, wherein said macromonomer comprises polymers selected from the group consisting of nucleophile terminated polystyrene, polyisoprene, polypropylene and poly(phenylene oxide).

32. The grafted polymer of claim 30, wherein said para-alkylstyrene is further included as:

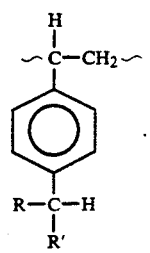

33. The grafted polymer of claim 30, wherein said para-alkylstyrene is further included as:

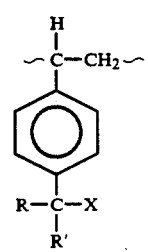

wherein X is halogen.

34. The grafted polymer of claim 30, wherein said para-alkylstyrene is further included as:

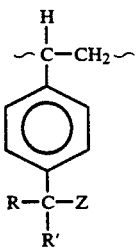

wherein Z is a functional group containing oxygen, sulfur, silicon, nitrogen, carbon, phosphorus or a metal selection from sodium, potassium, lithium, and magnesium.

35. The grafted polymer of claim 34, wherein said functional group comprises a radiation-reactive functional group.

36. The grafted polymer of claim 35, wherein said radiation-reactive functionality comprises a nucleophilically substituted photoinitiator selected from the group consisting of benzophenone, dithiocarbamates, cinnamates, and tung oil acid esters.

37. A graft polymer comprising:
a main chain comprising a polymer of one or more olefinic monomers; and
a plurality of side chains distributed along said main chain, wherein an average molecular weight of segments of said main chain between adjacent side chains ($M_{MCS}$) is in a range of from about 0.02 $M_e^A$ to about 2 $M_e^A$, wherein $M_e^A$ is the entanglement molecular weight of said main chain, and wherein the side chains have an average molecular weight ($M_{SC}$) in the range of from about 0.02 $M_e^B$ to about 2 $M_e^B$, wherein $M_e^B$ is the entanglement molecular weight of said side chains.

38. The graft polymer of claim 37, wherein said side chains comprise polymer selected from anionically polymerizable monomers.

39. The graft polymer of claim 37, wherein said side chains comprise polymer selected from the group consisting of polystyrene, polyisoprene, polypropylene, polyethylene, and poly(phenylene oxide).

40. The graft polymer of claim 37, wherein said main chain monomers are copolymerized with a norbornene terminated macromonomer.

41. The graft polymer of claim 40, wherein said norbornene functionality comprises 2-methyl-5-norbornene.

42. The graft polymer of claim 37, wherein said side chains are grafted to pendant functionality distributed in said main chain via a post-polymerization reaction.

43. The graft polymer of claim 37, wherein said olefinic monomers is selected from the group consisting of ethylene, propylene, 1-butene, 1-pentene, 1-hexene, 4-methyl-1-pentene and 1-octene.

44. The graft polymer of claim 37, wherein said olefinic monomer is selected from the group consisting of styrene, α-methylstyrene, α-vinylnaphthalene, 3-vinyltoluene and divinylbenzene.

45. The graft polymer of claim 37, wherein said olefinic monomer is selected from the group consisting of ethylene oxide, propylene oxide and phenylene oxide.

46. The graft polymer of claim 37, wherein said olefinic monomer is selected from the group consisting of methyl methacrylate, methyl acrylate, 2-ethylhexyl methacrylate, lauryl methacrylate, t-butyl acrylate, n-butyl acrylate and hydroxyethyl acrylate.

47. The graft polymer of claim 37, wherein said olefinic monomer is selected from the group consisting of acrylic acid and methacrylic acid.

48. The graft polymer of claim 37, wherein said olefinic monomer comprises acrylonitrile.

49. The graft polymer of claim 37, wherein said olefinic monomer is selected from the group consisting of sulfur dioxide and carbon monoxide.

50. The graft polymer of claim 37, wherein said olefinic monomer is selected from the group consisting of maleic acid, itaconic acid and citraconic acid and anhydrides thereof.

51. The graft polymer of claim 37, wherein said olefinic monomer is selected from the group consisting of vinyl chloride and vinylidene chloride.

52. The graft polymer of claim 37, further comprising a functional group containing oxygen, sulfur, silicon, nitrogen, carbon, phosphorus, or a metal selected from sodium, potassium, lithium and magnesium distributed along the polymer main chain.

53. The graft polymer of claim 52, wherein said functional group comprises a nucleophilically substituted photoinitiator selected from the group consisting of benzophenone, dithiocarbamates, cinnamates and tung oil acid esters.

54. A method for producing an entanglement inhibited grafted polymer, comprising the steps of:
(a) preparing a copolymer main chain of an isoolefin having from about 4 to about 7 carbon atoms and a para-alkylstyrene having a substantially homogeneous compositional distribution;
(b) halogenating said para-alkylstyrene in said polymer, said halide radicals being substantially alkyl-halide radicals attached to the pendant para-alkylstyrene and primarily alkylmonohalide radicals;
(c) introducing side chains attached to said para-alkyl groups by contacting said halogenated copolymer with a mononucleophilically terminated macromonomer to nucleophilically substitute said macromonomer as said side chains at said halogenated para-alkylstyrene groups, wherein an average molecular weight of segments of said copolymer main chain between said side chains is from about 0.02 $M_e^A$ to about 2 $M_e^A$, wherein $M_e^A$ is an entanglement molecular weight of the main chain, and wherein said macromonomer side chains have an average molecular weight of from about 0.02 $M_e^B$ to about 2 $M_e^B$, wherein $M_e^B$ is an entanglement molecular weight of said mononucleophilically terminated macromonomer; and
(d) optionally attaching additional functionality to said para-alkyl groups by contacting said halogenated copolymer with a nucleophilic reagent containing oxygen, sulfur, silicon nitrogen, carbon, phosphorus or a metal selected from sodium, potassium, lithium and magnesium.

55. The method of claim 54, wherein said functional group is radiation-reactive.

56. The method of claim 55, wherein said radiation-reactive functionality comprises a nucleophilically substituted photoinitiator selected from the group consisting of benzophenone, dithiocarbamates, cinnamates and tung oil acid esters.

57. The method of claim 54, further comprising the preliminary steps of reacting said isoolefin and said para-alkylstyrene in a polymerization reactor under polymerization conditions in the presence of a diluent and a Lewis Acid catalyst, maintaining said polymerization reactor substantially free of impurities which can complex with said catalyst or copolymerize with said isoolefin or said para-alkylstyrene to obtain a precursor copolymer, and contacting said precursor copolymer with a halogen in the presence of a free radical initiator to obtain said halogenated polymer.

58. The method of claim 54, wherein said isoolefin comprises isobutene and said para-alkylstyrene comprises para-methylstyrene.

59. The method of claim 54, wherein said halogen comprises bromine.

60. A method for producing an entanglement inhibited polymer, comprising polymerizing:
   (a) one or more olefin monomers; and
   (b) a norbornene terminated macromonomer wherein an average molecular weight of segments of said main chain between adjacent side chains ($M_{MCS}$) is in a range of from about 0.02 $M_e^A$ to about 2 $M_e^A$, wherein $M_e^A$ is the entanglement molecular weight of said main chain, and wherein the side chains have an average molecular weight ($M_{SC}$) in the range of from about 0.02 $M_e^B$ to about 2 $M_e^B$, wherein $M_e^B$ is the entanglement molecular weight of said side chains.

61. A method for producing an entanglement inhibited polymer, comprising reacting:
   (a) in a transesterification reaction, an olefin polymer comprising randomly distributed carboxylic acid functionality or esters thereof; and
   (b) a hydroxy or ester terminated macromonomer wherein an average molecular weight of segments of said main chain between adjacent side chains ($M_{MCS}$) is in a range of from about 0.02 $M_e^A$ to about 2 $M_e^A$, wherein $M_e^A$ is the entanglement molecular weight of said main chain, and wherein the side chains have an average molecular weight ($M_{SC}$) in the range of from about 0.02 $M_e^B$ to about 2 $M_e^B$, wherein $M_e^B$ is the entanglement molecular weight of said side chains.

62. A method for producing an entanglement inhibited polymer, comprising reacting:
   (a) in a nucleophilic reaction, an olefin polymer comprising randomly distributed electrophilic functionality; and
   (b) a nucleophilic terminated macromonomer wherein an average molecular weight of segments of said main chain between adjacent side chains ($M_{MCS}$) is in a range of from about 0.02 $M_e^A$ to about 2 $M_e^A$, wherein $M_e^A$ is the entanglement molecular weight of said main chain, and wherein the side chains have an average molecular weight ($M_{SC}$) in the range of from about 0.02 $M_e^B$ to about 2 $M_e^B$, wherein $M_e^B$ is the entanglement molecular weight of said side chains.

* * * * *